(12) United States Patent
McClellan

(10) Patent No.: US 8,075,302 B1
(45) Date of Patent: Dec. 13, 2011

(54) APPARATUS FOR OPTIMALLY MIXING AND INJECTING A TWO PART URETHANE FOAM

(76) Inventor: Luther W. McClellan, St. Louis, MO (US)

(*) Notice: Subject to any disclaimer, the term of this patent is extended or adjusted under 35 U.S.C. 154(b) by 52 days.

(21) Appl. No.: 12/651,452

(22) Filed: Jan. 1, 2010

Related U.S. Application Data

(60) Provisional application No. 61/204,210, filed on Jan. 2, 2009.

(51) Int. Cl.
*B65D 88/54* (2006.01)

(52) U.S. Cl. ........... 425/543; 422/318; 366/159.1; 366/162.4; 366/162.5; 425/546

(58) Field of Classification Search ............ 425/543, 425/546; 366/159.1, 162.4, 162.5; 422/318
See application file for complete search history.

(56) References Cited

U.S. PATENT DOCUMENTS

| | | | |
|---|---|---|---|
| 3,913,892 A | 10/1975 | Ersfeld et al. | |
| 4,368,847 A | 1/1983 | Ersfeld | |
| 4,477,191 A | 10/1984 | Ersfeld et al. | |
| 4,856,908 A * | 8/1989 | Hara et al. | 366/162.5 |
| 4,882,107 A * | 11/1989 | Cavender et al. | 264/51 |
| 5,053,202 A * | 10/1991 | Dwyer et al. | 422/135 |
| 6,832,558 B2 | 12/2004 | Weber et al. | |
| 7,044,340 B1 | 5/2006 | McClellan | |

* cited by examiner

*Primary Examiner* — Timothy Heitbrink
(74) *Attorney, Agent, or Firm* — Kevin L. Klug

(57) ABSTRACT

An apparatus and method for optimally mixing and injecting a two part urethane foam which utilizes a unique mixing head having needle type valves which are specially sealed and positioned, able to provide precisely controlled amounts of constituent mixing compounds, and are further able to resist clogging. The apparatus further includes an electric-pneumatic actuation system, an unmixed compound recirculation system, and a cleaning solvent injection system which are functional while the apparatus is in use. The apparatus and method precisely controls the temperature, pressure, and delivery rates for optimum urethane mixture, viscosity, delivery, reaction time, and reliability.

15 Claims, 32 Drawing Sheets

100  98  102 12

29

APPARATUS FOR OPTIMALLY MIXING AND INJECTING A TWO PART URETHANE FOAM

This application claims priority of U.S. Provisional Patent Application No. 61/204,210, filed Jan. 2$^{nd}$, 2009, entitled Apparatus for Optimally Mixing and Injecting a Two Part Urethane Foam.

BACKGROUND OF THE INVENTION

The present invention relates in general to an apparatus and method for mixing and injecting an urethane blend which forms a urethane foam and more particularly to an apparatus which is capable of repeatedly mixing, delivering, and injecting a preprogrammed amount of the urethane blend with minimal cleaning and clogging concerns. The present invention represents both a system for optimum delivery of the urethane blend and a unique mixing head which is used as a part of the system. It is capable of mixing and delivering a preprogrammed quantity of urethane in a very short period of time.

Urethane foam is a common compound which is often used to fill and seal gaps and holes within a structure and also provide added structural integrity within said gaps and holes. It has found wide use within the industrial, residential, and commercial sectors. It is also available in small canisters at most home supply stores. One of the many industrial uses for urethane foam includes the filling of holes or cavities in railroad ties. Railroad ties often contain holes which are formed from removed railroad spikes. A hole in a railroad tie allows entry of water and other materials which can serve to deteriorate the structural integrity of the tie. If filled with a material which expands to fit and seal the hole or cavity, and which further is capable of contracting, expanding, and moving with the tie, the hole or cavity remains sealed and the internal structure of the tie is protected from external elements. The art of the present invention is capable of precisely mixing and repeatedly delivering the components of urethane foam in a preprogrammed amount and is especially adapted for delivering the mixed foam into spike holes or cavities within railroad ties.

As intimated, urethane foam is formed when an urethane blend is mixed with a high molecular weight alcohol. That is, when a 4,4-diphenylmethane (MDI) compound (or equivalent) is thoroughly mixed with a polyol, typically a polyhydric alcohol containing three or more hydroxyl groups (or equivalent), an exothermic reaction occurs which forms a thermosetting urethane foam. To date, attempts at mixing and delivering preprogrammed amounts of a urethane foam have been fraught with problems. Prior to the art of the present invention, the mixing and delivering devices had a minimal amount of control over the quantity of urethane foam delivered. The user could not be assured that the same preprogrammed amount of urethane could or would be delivered for every shot or use of the device. Further problems of the prior art included clogging or premature curing of the mixture within the mixing head. That is, if the urethane hardens within the mixing head it often clogs the head and prevents delivery of the mixture. This is especially true when one of the constituent compounds bleeds into the supply line or valve for the other compound. An even further prior art problem includes the excessive amount of time which was necessary to deliver a preprogrammed amount of urethane. Ideally, the urethane mixture should be delivered instantaneously.

The present art overcomes the aforementioned prior art limitations by providing an apparatus, system, and method for mixing, delivering, and injecting a preprogrammed and repeatable amount of urethane in a short period of time without clogging or premature curing of the urethane mixture within the mixing head which delivers the urethane. The preferred embodiment of the present art utilizes uniquely heated storage and feed tanks for reducing the viscosity and improving cure time of the urethane constituents and a unique pump assembly to assure quick and repeatable delivery of the constituent compounds.

Accordingly, it is an object of the present invention to provide a method, system, and device for optimally mixing and injecting a two part urethane foam which is capable of delivering a repeatable and programmed amount of urethane foam into a hole or cavity.

Another object of the present invention is to provide a method, system, and device for optimally mixing and injecting a two part urethane foam which does not exhibit mixing head clogging when properly used.

Another object of the present invention is to provide a method, system, and apparatus for optimally mixing and injecting a urethane which is capable of mobility on railroad tracks and on railroad ties when a rail has been removed.

A further object of the present invention is to provide a method, system, and device for optimally mixing and injecting a two part urethane foam which delivers the urethane quickly.

A still further object of the present invention is to provide a new and improved mixing head as an integral part of the present art apparatus which provides the aforementioned advantages and is designed to work in conjunction with the present art apparatus.

A yet further object of the present invention is to provide a pump mechanism capable of continuous pumping action in both extension and reflex for precise mixture control.

SUMMARY OF THE INVENTION

To accomplish the foregoing and other objects of this invention there is provided an apparatus and method for optimally mixing and injecting a two part urethane foam. It will be understood by those skilled in the art that the present art may be utilized with urethane elastomers and polyurea foams and elastomers without departing from the scope and spirit of the present art. In its preferred embodiment, the system comprises two or more heated holding tanks, two or more pumps connected via a hose to said tanks, two or more constant temperature heating units connected via a hose to said pumps, one or more mixing heads, a solvent and air injector connected to said mixing head via a hose, a static mixer, a recirculation system, and a timer/air valve assembly which triggers the mixing head. Some of the components of the present system and apparatus are commercially available and uniquely combined in such a fashion as to deliver the results described herein. The dispensing or mixing head assembly which is typically mounted onto a frame is a non commercially available apparatus which is specially designed to achieve the results described herein. The mixing head with its unique features and functions along with the arrangement of components which feed the urethane mixture to the mixing head, represent a unique and novel way of mixing and injecting a preprogrammed amount of urethane upon demand.

When disclosure of a commercially available component is satisfactorily described to those skilled in the art by block representation, said component along with its description, operation, and function shall be represented by a block within the drawings included herein or described in such terms as would allow one skilled in the art to practice the present invention. Those components which are not available as a commercial component and which are unique to the present art shall be presented in full detail in the drawings included herein. This document makes no claim to the isocyanate blend or the polyol compositions or to the product of their reaction.

In a preferred embodiment, each holding tank is used to hold either the isocyanate blend compound, a 4,4-diphenylmethane (MDI) compound (or equivalent), or polyol compound, typically a polyhydric alcohol containing three or more hydroxyl groups, separate from the other compound(s). More than two tanks may be employed when the mixture requires more than two reactive agents without departing from the spirit or scope of the present art. Alternative embodiments may further utilize other compounds within the isocyanate or polyol components. Heating elements, preferably electrically actuated, heat the compounds as they exit and recirculate from the tanks. Alternative embodiments may forego incorporation of said heating elements when the ambient conditions, compound reaction, and viscosity requirements allow. That is, the reaction time and viscosity of each constituent compound is affected by temperature. If the ambient temperature allows for the proper reaction and viscosity, heating is not needed. Further alternative embodiments utilize industry recognized plate heaters, in addition to or in lieu of the aforesaid heating methods, mounted with or within the lines feeding the mixing head. Further alternative embodiments may utilize a heating element in the line between the holding tank and the suction side of each pump in lieu of or in addition to the aforesaid heating methods.

Each of the compounds to be mixed exit their respective tanks into a pump, typically through a hose which is not affected by the compound within. Each compound has its own pump, yet each pump is synchronously coupled to every other pump to ensure an exact mixture of each compound, typically one-to-one. That is, each pump provides a flow rate of material which is an unchanging multiple or fraction of the other pumps in order to assure proper ratio mixing. In a preferred embodiment, the synchronous coupling is typically achieved via a mechanical linkage between two or more pistons which are capable of providing a hydraulic exiting pressure on both the up and down stroke. Preferably said linkage/piston combination is actuated by a hydraulic drive but may also be actuated by an electric motor, solenoid, or pneumatic means. Alternative embodiments may allow for said synchronous coupling through electronic control of separate pumps. Said coupling ensures that the proper volume of each compound enters the mixing head at the same instant of time so that an exact mixing ratio is maintained.

For an alternative embodiment, a constant temperature heater is also placed and connected between each pump suction or discharge side and the holding tank, again via a hose which is not affected by the compound within. Each heater maintains the flowing compound at an operator determined temperature which provides for optimum compound viscosity and density control and the density of the product of reaction.

Upon exiting from the pumps, each compound is fed into a mixing head, again through a hose which is not affected by the compound within. The feed into said mixing head allows for each of said compounds to enter said head or recirculate back to the respective holding tanks through check valves within each line. Alternative embodiments utilize manual recirculation valves which are open when actuation of said mixing head is not desired and allow the compounds to recirculate into the respective holding tanks. It is important to note that in a preferred embodiment, each pump can be adjusted, modified, or selected to provide a limited maximum pressure. Alternative embodiments may provide other in-line pressure relief valves or electrically, pneumatically, or hydraulically control the recirculation valves which close or open upon demand.

When actuation and use of the mixing head is desired, any manual recirculation valves (if utilized) within the recirculation hoses are closed, thereby preventing recirculation into the holding tanks and providing maximum compound pressure into the mixing head. Upon actuation of said mixing head for a preprogrammed user determined amount of time, each of said reactive compounds which enter said mixing head are allowed to enter a commercially available static mixer and thereafter into the area or volume in which said urethane foam is required. Said mixing head further provides for injection of a solvent, typically a di-basic ester, for cleaning one or more compound chambers and static mixer after said compounds have been mixed. An air flush is typically provided thereafter through the solvent and air injection hose for drying said solvent. In a preferred embodiment, said solvent injection is automatically controlled and said air injection is manually controlled, but alternative embodiments may incorporate manual solvent injectors after one or more mixing cycles. That is, instead of the operator turning a solvent valve and then a compressed air valve of the solvent and air injector, the valves are controlled automatically and without operator intervention in order to provide solvent and/or then compressed air injection after the desirable number of mixing cycles. For the preferred embodiment, the solvent is injected approximately 13 seconds after actuation of the valve actuator.

The mixing head is comprised of two or more compound entrance holes and exit holes, two or more compound chambers, a solvent injection hole with a check valve protected passage to the mixing chamber, a compound valve actuator, typically an electrically controlled pneumatic cylinder, two or more compound needle valves, and two compound exiting holes which feed said static mixer. Unlike the prior art which utilizes slide valves, such as the Mixing Apparatus of Ersfeld, U.S. Pat. No. 3,913,892, the present art utilizes needle valves which substantially reduce clogging occurrences within the mixing head. As further described herein, each component, chamber, passage, or compound valve is sealed with the necessary seals, gaskets, O-rings, or interface to prevent leakage or unintented mixing of the compounds. Each compound entrance hole provides for the entrance of each reactive compound into the mixing head and also into its respective compound chamber. For the preferred embodiment, each reactive compound is recirculated back to said respective holding tank when a pressure is achieved which is sufficient to open the pressure relief valves within the lines. If said compound valves are actuated by said valve actuator, each of said pressurized compounds are allowed to enter said static mixer through said mixture exiting holes and thoroughly mix prior to placement. Said solvent injection hole intersects with one or more compound chambers via one or more check valve protected passages in order for solvent and/or air to be injected therein and provide for cleaning of the compound chamber(s) and the static mixer. The check valve provides protection from compound or urethane entry into the solvent and air injection hole, passage, or hose. The static mixer is available commercially from manufacturers such as Plas-Pak Industries, Inc. of Norwich, Conn. and is typically comprised of a tube having an internal double helix path of flow which provides for a turbulent mixing flow of said mixed compounds. A static mixer is a unique element, the construction of which is specifically understood by those skilled within the chemical blending and mixing arts.

In a preferred embodiment, the tip of each needle valve, when closed, extends slightly into the compound chamber in order to ensure that the bores of said valves remain clean and free from the compound within the chamber. The preferred embodiment further seals the tips of the needle valves with O-rings which are preferably manufactured of TEFLON (chemically known as polytetrafluoroethylene). The O-ring seal ensures that compound does not enter the needle valve body and cause it to stick. Furthermore, although a preferred embodiment allows for the actuation of said valves with an electrically controlled pneumatic cylinder as a valve actuator, alternative embodiments may also provide for electric solenoidal, motor, or hydraulic control. The benefits and functionality offered by needle valves within the present art apparatus are critical to operation and cannot be reproduced with other types of valves.

The timer of the present art, preferably electronic, allows for an electrical pulse of preprogrammed pulsewidth to control the open and closed time of said valves through said valve actuator in order to provide a desired mix volume output. That is, if the pressure and flow rate is controlled by the synchronous pumps, the amount of compound which is mixed and delivered through the static mixer is simply a linear function of how long the compound valves are left open. The valve actuator is capable of providing positive force for opening and closing the compound valves. When the valve actuator is pneumatic, two air flow hoses are provided to the pneumatic cylinder to provide positive and negative force and movement upon the compound valves. The electric valve allows for one air flow hose to exhaust while the other hose is pressurized. Furthermore, the valve actuator is spring loaded to provide a default closure of the compound valves if necessary. The timer is commercially available and is claimed only in conjunction with the system described herein.

The recirculation system typically comprises two or more hoses which feed any unmixed compound back into the respective holding tanks. Recirculation ensures temperature control and prevents separation of the constituent compounds. In the preferred embodiment, the recirculation path has a pressure relief valve which automatically opens and allows recirculation if the compound valves are not open. An alternative embodiment also utilizes manual three way valves for recirculation in addition to or in lieu of the pressure relief valve.

In operation, the user places the exiting tube portion or open end of the static mixer into the area or volume which requires the urethane mix. Upon triggering of the timer, an electrical pulse is created which actuates an electrically controlled pneumatic valve which pressurizes the compound valve opening air line and exhausts to atmosphere the compound valve closing air line. The compressed air thus supplied to the pneumatic valve actuator thereby opens the compound valves. The compound valves allow a predetermined volume of each compound to enter the static mixer. The compounds are then mixed within the static mixer through the turbulent flow provided by the static mixer and thereafter exit the open end of the static mixer as a urethane mixture. The user may thereafter open one or more valves corresponding to solvent and air injection to provide solvent and/or air to clean one or more compound chambers and the static mixer or simply allow the auto flush feature to perform the cleaning after a short period of non-use. When not injecting a urethane mix, the check valves automatically open and allow compound recirculation for optimum temperature and viscosity control.

The art of the present invention may be manufactured from a variety of materials provided that said materials do not adversely react with the reacting compounds or are properly coated to prevent such a reaction. Said materials include but are not limited to various metals and their alloys, woods, rubbers, plastics, or composites as required by the application.

BRIEF DESCRIPTION OF THE DRAWINGS

FIGS. 1-10, 12-16, and 18-19 utilize a photograph as the only practicable medium for illustrating the claimed invention as a whole pursuant to 37 CFR 1.84. Numerous other objects, features and advantages of the invention should now become apparent upon a reading of the following detailed description taken in conjunction with the accompanying drawings, in which:

FIG. 1 is a front perspective view of a preferred embodiment of an apparatus for optimally mixing and injecting a two part urethane foam mounted upon a carriage for transportation on railroad rails showing its unique method of use during a railroad tie filling application.

FIG. 2 is a front perspective view of another form of a preferred embodiment of an apparatus for optimally mixing and injecting a two part urethane foam showing the dispensing and mixing head assembly and applicator frame mounted upon a carriage for transportation on railroad rails.

FIG. 3 is a left side perspective view of a preferred embodiment of an apparatus for optimally mixing and injecting a two part urethane foam showing two heated holding tanks, hydraulic components, on board generator, and carriage for transportation on railroad rails.

FIG. 4 is a right side perspective view of a preferred embodiment of an apparatus for optimally mixing and injecting a two part urethane foam showing a heated holding tank, hydraulic components, on board generator, terrain drive and carriage for transportation on railroad rails.

FIG. 5 is a front perspective view of a preferred embodiment of an apparatus for optimally mixing and injecting a two part urethane foam showing two heated holding tanks and pumps all mounted upon a carriage for transportation on railroad rails.

FIG. 6 is a top front perspective view of a preferred embodiment of an apparatus for optimally mixing and injecting a two part urethane foam showing two heated holding tanks and hoses all mounted upon a carriage for transportation on railroad rails.

FIG. 7 is a top front perspective view of an alternative embodiment of an apparatus for optimally mixing and injecting a two part urethane foam showing the pump mechanical linkage with a hinged plate having a groove or slot within said hinged plate with pinned or clevis type joints, a hydraulic drive cylinder on a first side of the hinge axis and two pumping pistons coupled onto the second side of the hinged axis, pump exiting hoses, limit switches triggered by the position of the hinged plate, pump/cylinder mounting bracket, and two heated holding tanks in the background.

FIG. 8 is a top front perspective view of an alternative embodiment of an apparatus for optimally mixing and injecting a two part urethane foam showing the same components as described in FIG. 7.

FIG. 9 is a front perspective view of an alternative embodiment of an apparatus for optimally mixing and injecting a two part urethane foam showing a hinged plate having a groove or slot within said hinged plate with pinned or clevis type joints, two pumping pistons coupled onto the second side of the hinged axis, pump exiting hoses, pump/cylinder mounting bracket, and a limit switch triggered by the position of the hinged plate.

FIG. 10 is a front perspective view of an alternative embodiment apparatus for optimally mixing and injecting a two part urethane foam.

FIG. 12 is an exploded view of a preferred embodiment of the dispensing and mixing head showing the static mixer, the mixing block, seal plate, valving block, compound pin valves, O-rings, packing, valve actuating air cylinder, and associated connecting and mounting hardware.

FIG. 13 is a front perspective view of a preferred embodiment of a pump assembly and tanks.

FIG. 14 is a perspective view of an alternative embodiment of the hydraulic drive cylinder and its associated pivoting clevis and mounting hardware, showing the extension and reflux hydraulic fluid entrance/exit ports.

FIG. 15 is a perspective view of an alternative embodiment of the pumps and associated mounting hardware, including piston coupling nuts, piston clevis, and pump rings. Said pump rings pivotably secure or cradle said pumps to a bracket which allows said pumps to pivot during operation.

FIG. 16 is a perspective view of an alternative embodiment of the pump and hydraulic cylinder frame showing the support legs, pump/hydraulic cylinder mounting bracket also known as a support base, the hinged plate also known as wobble plate, along with the clevis and other mounting hardware.

FIG. 18 is a perspective view of a preferred embodiment of the heating unit utilized at the suction or discharge portions of the pumps.

FIG. 19 is a perspective view of a preferred embodiment of the debris blower.

DETAILED DESCRIPTION

Figure 1:
Figure 2:
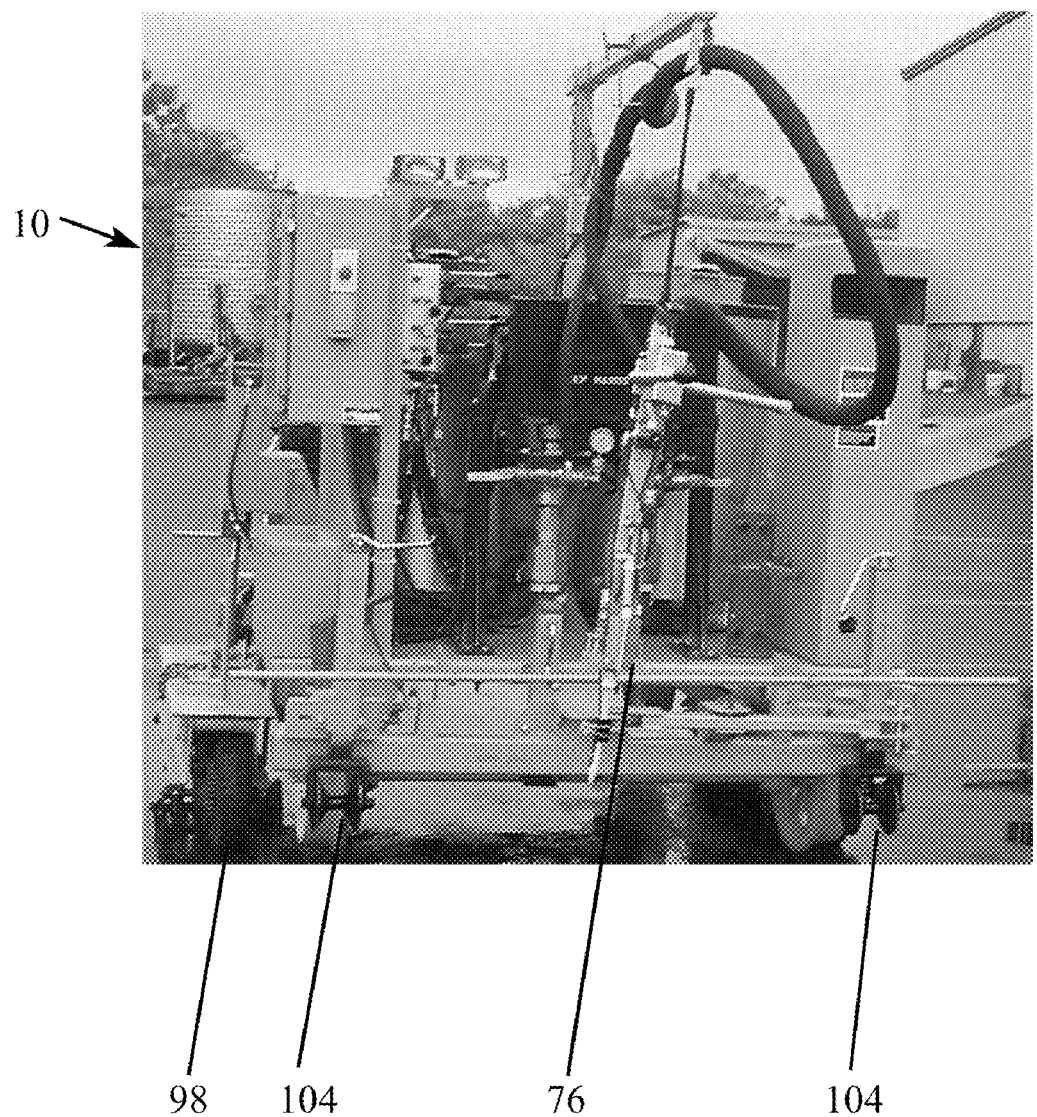
Figure 3:
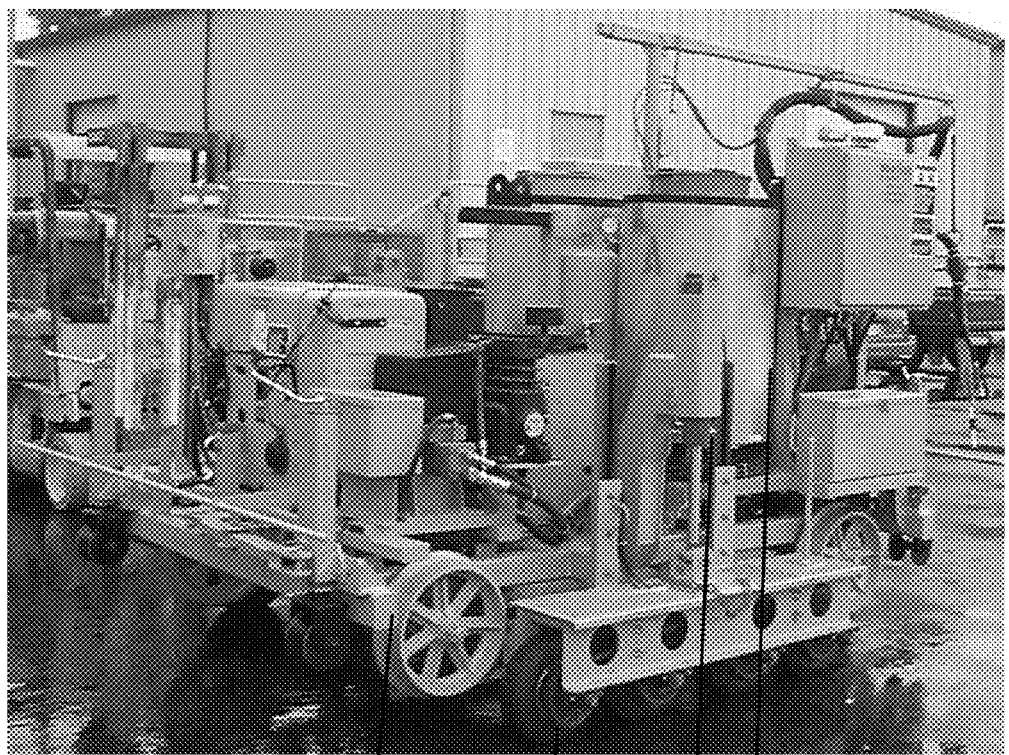
Figure 4:
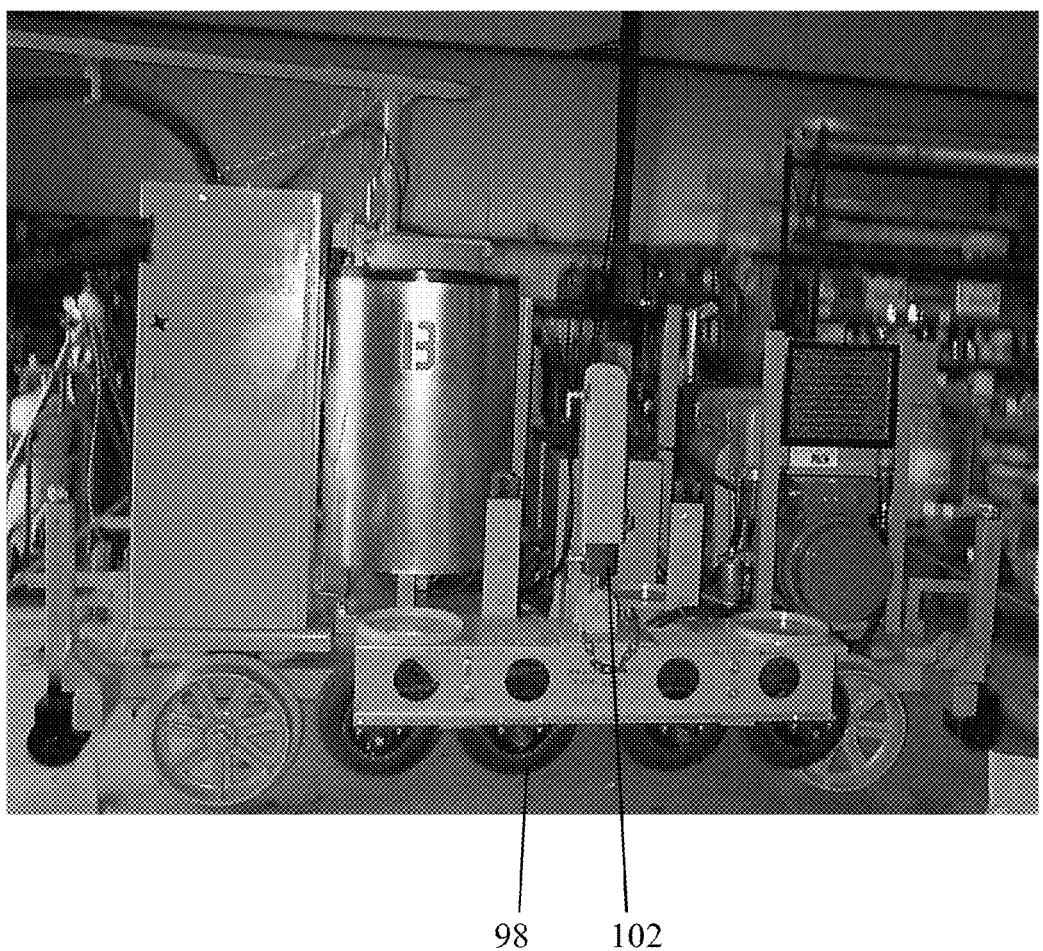
Figure 5:
Figure 6:
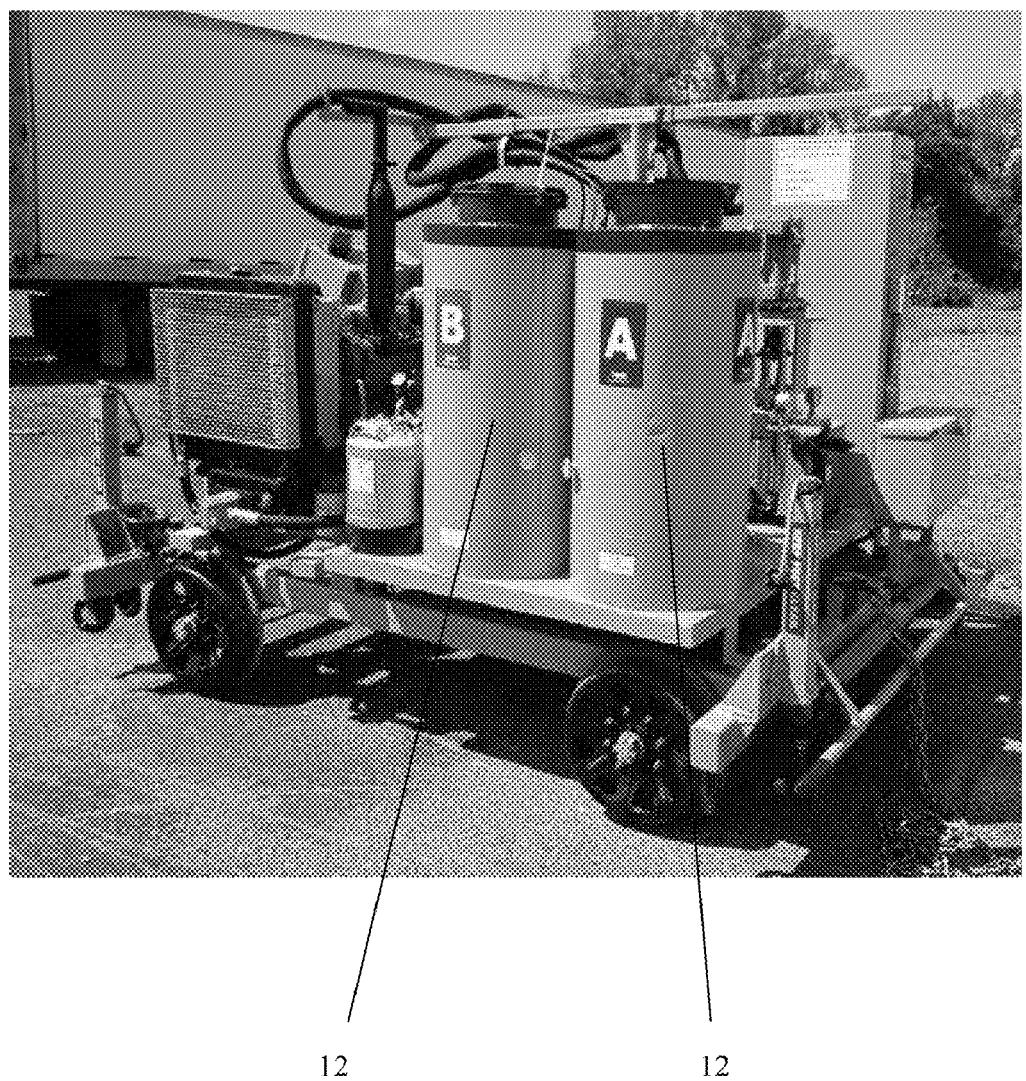
Figure 7:
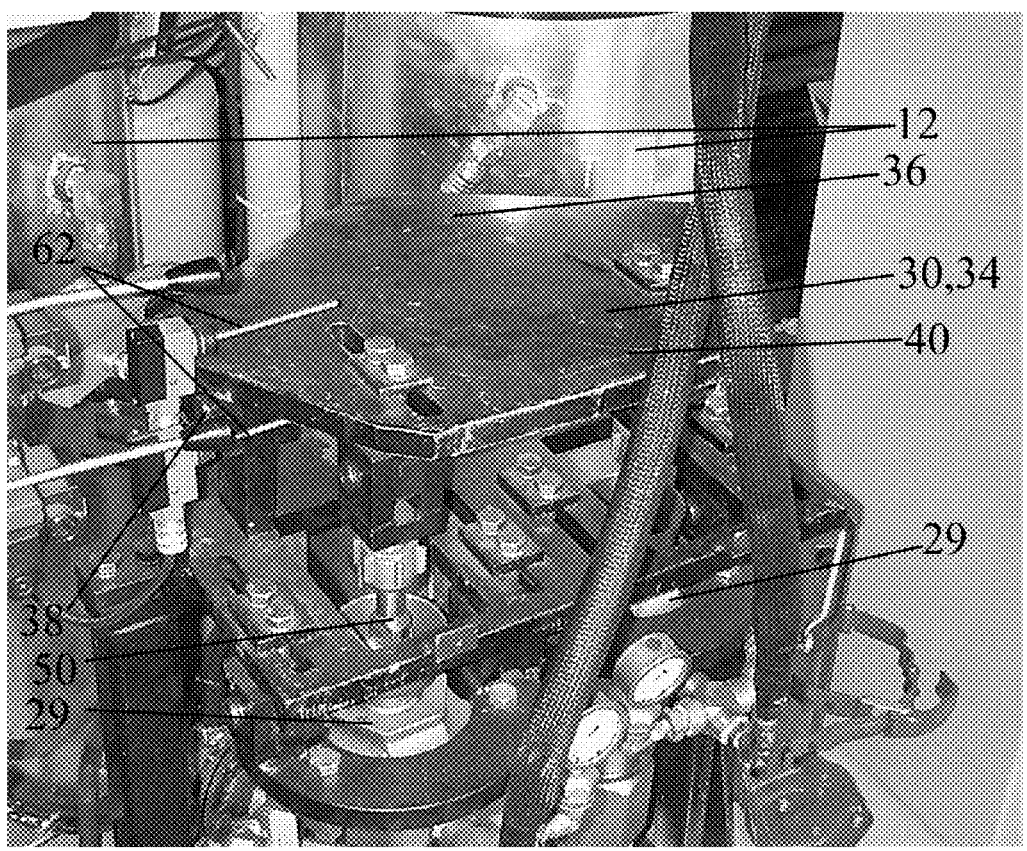
Figure 8:
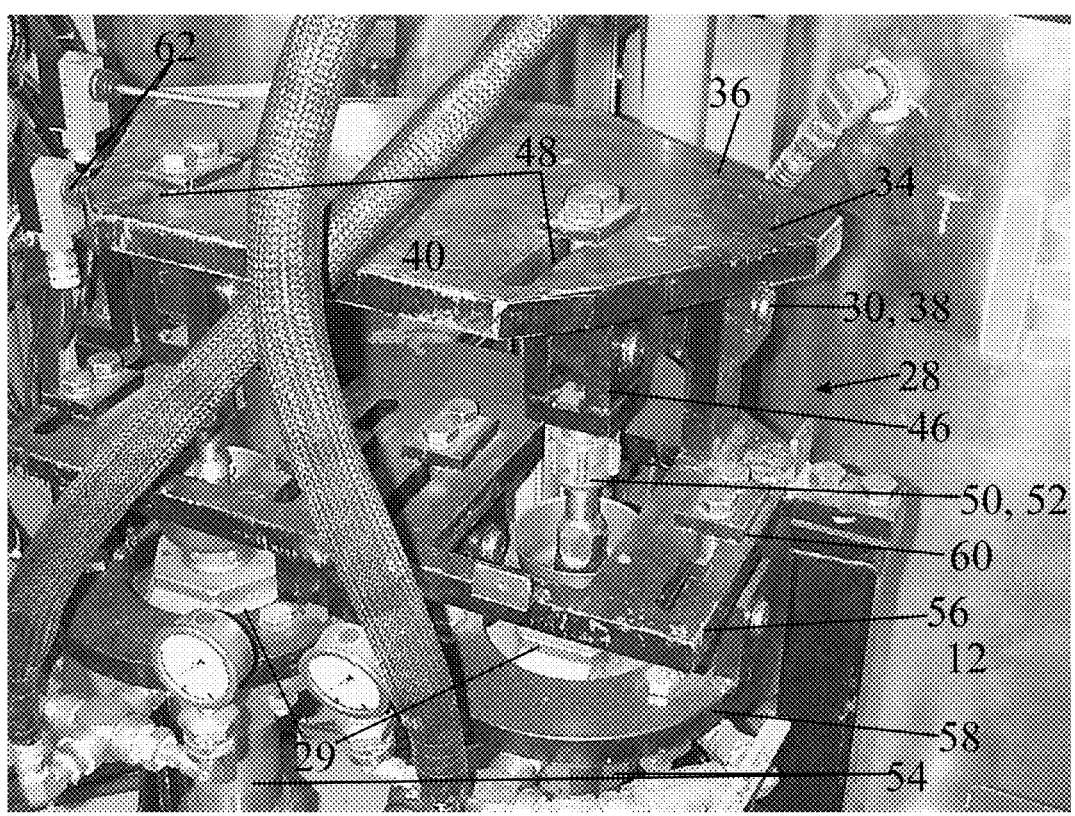
Figure 9:
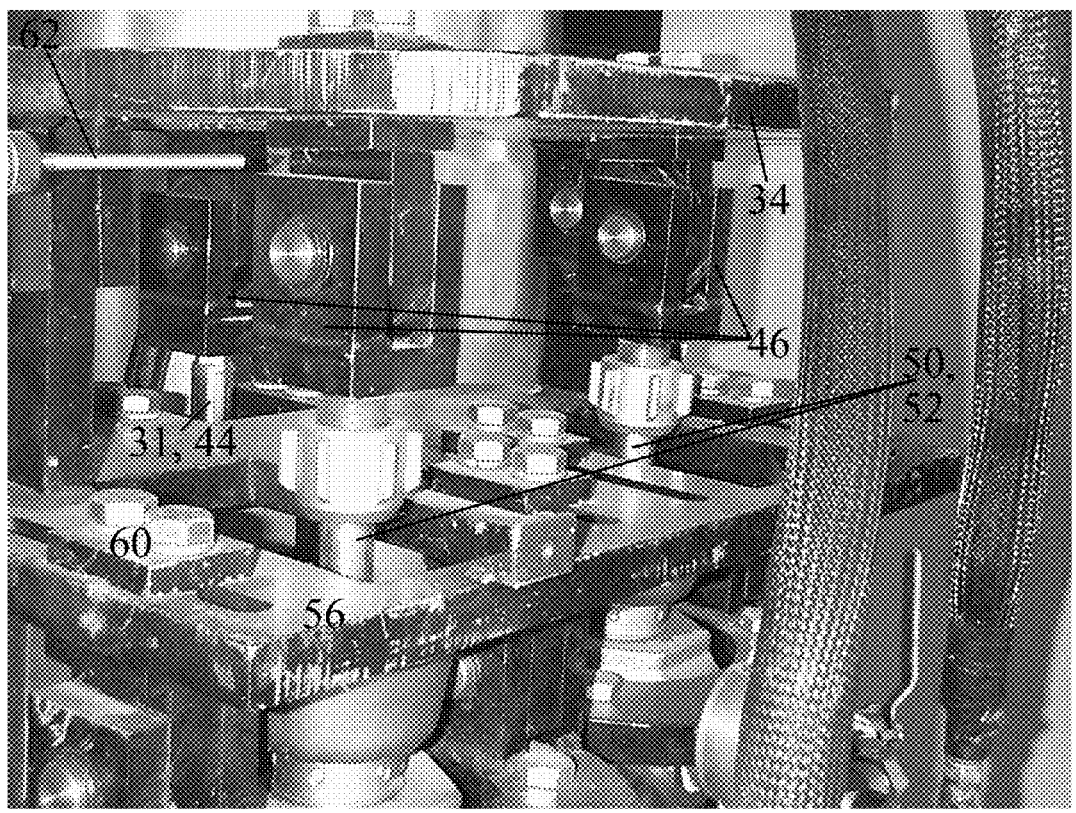
Figure 10:
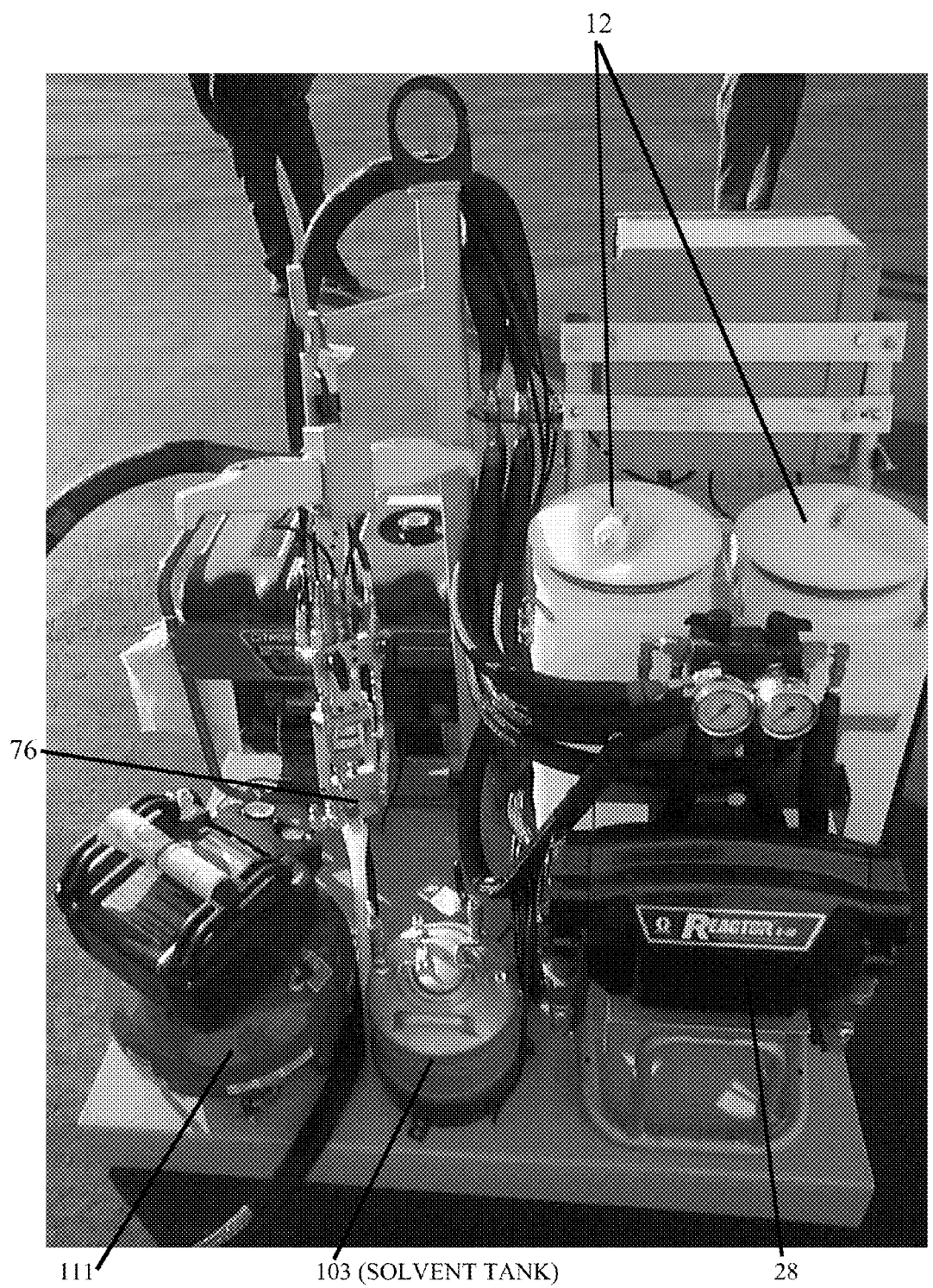
Figure 11:
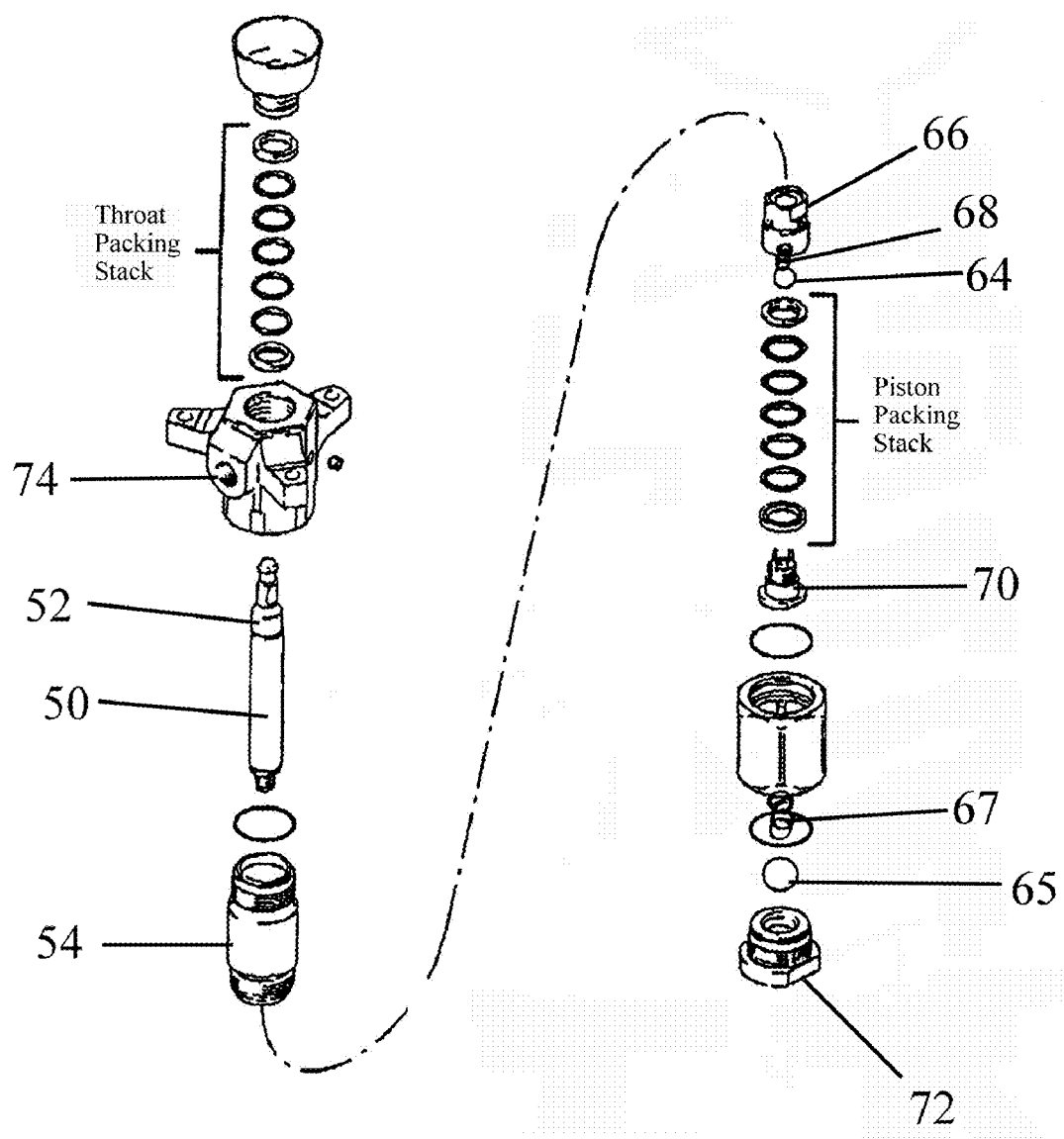
FIG. 11 is an exploded view of one of one of the pistons/cylinder pumps showing the connecting rod, discharge port, connecting rod packing and sealing materials, cylinder and its wall, piston, piston ball check valve with added spring bias, piston packing and sealing materials, piston ball check valve seat, intake port ball check valve, and the intake port. The pumps are substantially the same for preferred and alternative embodiments with a preferred embodiment not having a spring bias on the piston check valves 64, 65.

Referring now to the drawings, there is shown in FIGS. 1-6, 12, 13, 17-20, & 25-30 a preferred embodiment of the apparatus and method for optimally mixing and injecting a two part urethane foam 10 and alternative embodiments in FIGS. 7-10, 14-16, 21-23, 31-33 with FIG. 11 being substantially equivalent for all embodiments. The apparatus for optimally mixing and injecting a two part urethane foam 10 is particularly adapted for mixing a two part urethane in a precise ratio and amount and delivering the mixture into a hole or void, especially holes and voids left by railroad spikes in railroad ties. The apparatus and method 10 substantially prolongs the life of conventional railroad ties thereby minimizing the environmental impact of and necessity for old railroad tie disposal. The apparatus and method 10 also offers a more economical choice than the traditional wood tie plug (a one size fits all concept) thereby increasing the lifespan of the tie by more effectively sealing the voids or cavities than a wood tie plug. The apparatus and method 10 also promotes rail and passenger safety by assuring a better railroad spike hold and retention. The apparatus and method 10 further provides a unique mixing head 76 which resists clogging and is able to quickly provide precisely programmed and controlled amounts of urethane mixture into a hole or void. The apparatus and method 10 further represents a unique combination of specialty components which when assembled in the unique fashion shown and described herein provide the novel features and benefits disclosed. All component attachments, when necessary, are achieved with conventional fasteners such as screws, bolts, threads, pins, welds, adhesives, tubes, or rivets as recognized by those skilled within the arts.

The drawings show the apparatus 10 mounted upon a carriage 100 and first comprising, in a preferred embodiment, two or more holding tanks 12. In a preferred embodiment, each holding tank 12 is used to hold either a polyol or isocyanate. More than two tanks 12 may be employed when the mixture requires more than two reactive agents without departing from the spirit or scope of the present art. The preferred embodiments utilize plate heaters 17 within the base of the tanks 12 or inline preheaters, process heaters, or constant temperature heating units 25 within the constituent compound lines.

The alternative embodiment incorporates a cavity 14 within the base and substantially surrounding each holding tank 12 into which is placed a heat transferring liquid 16 such as 50% ethylene glycol and 50% water mixture, or any other heat transferring liquid capable of heat transfer at the temperatures herein described. Heating elements 18, preferably electrically actuated, such as industry standard firerods or other heating elements 18 are inserted into said heat transferring liquid 16 or placed onto the cavity 14. As the liquid 16 heats, it uniformly transfers said heat to the polyol or isocyanate, thereby reducing the viscosity of said materials. Without the heat transferring bath surrounding the compounds, hot spots within the tank 12 tend to harden or scorch portions of the compounds within the tanks. For the preferred embodiment, an adjustable temperature sensor 20 monitors the liquid bath temperature and through the opening of relay contacts (or other electrical, electronic, or mechanical switches) turns off the heating elements 18 when a compound reaches a desired temperature (typically 100° F. to 125° F.). In addition to reducing viscosity, the heating action of the compounds promotes the urethane curing action or reaction when mixed. Alternative embodiments may forego incorporation of said heating elements 18 when the ambient conditions, compound reaction, and viscosity requirements allow. Still further alternative embodiments may use other or additional types of heating methods and place them at locations other than the base of the holding tanks 12. These heating methods include but are not limited to rod heaters, induction, microwave, gas, oil, steam, or electrical heat tape in the transport or compound lines.

Each of the compounds to be mixed exit their respective tanks 12 via an exiting port 26 into a pump assembly 28, typically through a hose which is not affected by the compound within. Each compound has its own pump 29, yet each pump 29 is synchronously coupled to the other pump(s) 29 to ensure an exact mixture of each compound. That is, each pump 29 provides a flow rate of material which is an unchanging multiple or fraction of the other pump(s) 29 in order to assure proper ratio mixing. In a preferred embodiment, the synchronous coupling is typically achieved via a mechanical linkage 30 between two or more pistons which are capable of providing exiting pressure on both the up (extension) and down (reflex or retraction) stroke. Typically said linkage 30/piston combination is actuated by a hydraulic cylinder drive 32 but may also be actuated by an electric motor, gear drive, or pneumatic means. In alternative embodiments, said synchronism may be accomplished via electronic means whereby motor speed or speed reduction ratios are controlled. Said coupling ensures that the proper volume of each compound enters the mixing head at the same instant of time so that an exact mixing ratio is maintained.

For the preferred embodiment, the isocyanate component exits a first holding tank 12 into a suction side of a first synchronous pump 29 and the polyol exits a second holding tank 12 into a suction side of a second synchronous pump 29. Each pump 29 operates in synchronism with the other. That is, each provides a substantially exact proportional compound flow relative to the other. This ensures that a constant mixture ratio is maintained. Typically this ratio is one-to-one but may be any ratio required by the compounds. In a preferred embodiment the model #207-914 or #238-223 or 1200 series pumps by Graco® are often used but any pump or series of pumps which are capable of providing synchronous operation are useable. In a preferred embodiment, the synchronism is achieved by a mechanical coupling between the pistons of the two pumps 29. In the preferred embodiment, the aforementioned pumps 29 ensure a proportional flow of compound material which is recirculated into the holding tanks 12 via the pressure relief valves 19, 21 when the mixing head 76 is not actuated. In the preferred embodiment, the aforementioned pumps 29 also have integral maximum pressure regulators which limit the maximum pressured achieved. If manual recirculation valves 23 are utilized which block the recirculation path, the apparatus relies upon the pump 29 regulators for compound pressure control. Typically the pumps 29 are connected to the holding tanks 12 with hoses capable of holding the maximum pressure provided by the pumps 29 and which are not affected by the compound within.

In preferred and alternative embodiments, each compound is forced into and through its own constant temperature heating unit 25 (i.e. process heater) upon exiting from its respective pump 29. Again the compound is fed through a hose which is not affected by the compound within. The first synchronous pump 29 feeds a first constant temperature heating unit 25 and the second synchronous pump 29 feeds a second constant temperature heating unit 25. Each heating unit 25 maintains the flowing compound at an operator determined temperature which provides for optimum compound viscosity and density control, the density of the reaction product, and the rate of reaction. As aforesaid, alternative embodiments may forego the use of said heating units 25 without departing from the scope and spirit of the present art.

For the alternative embodiment, the aforesaid pump mechanical linkage 30 is best described as a connecting plate or yoke 33 which attaches with a hydraulic drive cylinder 32 end 31 and the individual pump 29 connecting rod 50 ends 52. That is, the connecting plate or yoke 33 connects the hydraulic cylinder drive 32 directly to the pumps 29.

An alternative embodiment utilizes a hinged plate 34 having the hydraulic drive cylinder 32 on a first side 36 of the hinge axis 38 and the pumping pistons 66 coupled onto the other or second side 40 of the hinged axis 38. In the preferred embodiment, the hydraulic drive cylinder 32 is driven by a pressure controlled hydraulic pump. Said hydraulic drive cylinder 32 is pivotably secured to a bracket 42 and the extension rod 44 from said cylinder 32 is pivotably attached with a clevis 46 to said hinged plate 34. The controlled hydraulic pressure of the hydraulic drive cylinder 32 limits the maximum pressure within the pumping pistons 29. Within said second side 40 of the hinged plate 34 are two or more grooves or slots 48 into which pivotably mount the external ends 52 of the piston pump connecting rods 50. The grooves 48 are preferably placed substantially perpendicular with the hinge axis 38 of the hinged plate 34 thereby allowing the connecting rod 50 external ends 52 to be slideably placed and secured at a desired distance from the hinged axis 38. The closer a piston connecting rod 50 external end 52 is placed to the hinge axis 38, the smaller the ratio of connecting rod 50 displacement to hydraulic drive cylinder 32 displacement. Thus if $L_1$ represents the distance on the plate 34 from the hydraulic drive cylinder 32 end 31 to the hinged axis 38, and $L_2$ represents the distance on the plate 34 from the first piston connecting rod 50 external end 52 to the hinged axis 38, and $d_1$ represents the linear displacement of the hydraulic drive 32, and $d_2$ represents the linear displacement of the first piston connecting rod 50, then in equation form:

$$d_2 = \frac{d_1}{L_1} * L_2$$

For a second piston where $L_3$ represents the distance on the plate 34 from the second piston connecting rod 50 external end 52 to the hinged axis 38 and $d_3$ represents the linear displacement of Other connecting rod 50 for the second piston, then in equation form:

$$d_3 = \frac{d_1}{L_1} * L_3$$

Thus, from the foregoing, it can be seen that the ratio of $d_2/d_3$ is summarized as:

$$\frac{d_2}{d_3} = \frac{L_2}{L_3}$$

Since the volume of piston displacement is directly proportional to its connecting rod 50 stroke linear displacement, for equal diameter piston/cylinder pumps, the material ratio mixture provided by two piston pumps 29 is simply the ratio of lengths at which each connecting rod 50 end 52 is secured from the hinge axis 38, thereby providing the variable ratio pump 28.

For the alternative embodiment, each external end 52 of each connecting rod 50 is preferably mounted to each groove or slot 48 within said hinged plate 34 with a pinned or clevis 46 type joint. The pinned joint frictionally bolts within said groove 48 yet allows the connecting rod 50 end 52 to pivot on a pin mounted within said clevis 46 as the hinged plate 34 pivots on its hinged axis 38. The cylinders 54 for each pump 29 are further mounted on a hinged cradle 56 comprised of a pump ring 58 attached to said cylinders 54 and pivotably secured to a mounting bracket 60. This hinging allows the cylinders 54 to pivot as the angle of the connecting rods 50 change with the hinged plate 34 movement. The pivoting action or motion of the pump cylinders 54 further helps the viscous compounds to flow.

For the preferred and alternative embodiments, limit switches 62 are mounted near the connecting plate 33 or the hinged plate 34 in order to control the movement of the hydraulic drive cylinder 54. That is, when the pumps 29 or hydraulic drive cylinder 32 reach a maximum extension or reflex stroke, the hydraulic drive cylinder 32 movement must be reversed. Since the pumps 29 operate in both extension and reflex, reversal of the hydraulic drive cylinder 32 movement does not substantially affect the flow of the urethane compounds. The limit switches 62 are triggered by the position of the connecting plate 33 or hinged plate 34 and control an electric hydraulic valve which reverses the hydraulic pressure to the drive cylinder ports, thereby allowing the immediately prior drive port to drain into a hydraulic fluid reservoir and the newly or second pressurized drive port to supply pressure to drive the cylinder. Typically said limit switches 62 are electrical and control an electro-hydraulic valve, but alternative embodiments may utilize mechanical switches or valves which directly control the flow of the pressurized hydraulic fluid to said drive cylinder.

In a preferred embodiment, each pump 29 is a conventional piston and cylinder arrangement which is capable of positive pumping on both the extension and reflex stroke and having check valves 64, 65 to prevent reflux into the storage tanks 12 and assure a positive and metered discharge. Further alternative embodiments utilize spring biases 67, 68 on the check valves 64, 65 of the pump 29 for positive valve sealing with highly viscous urethane mixtures.

As seen in FIG. 11, each preferred embodiment pump 29 comprises a connecting rod 50 attached to a piston 66 which operates within a cylinder 54. Each piston 66 has an included ball check valve 64 which seats onto a valve seat 70 which attaches with said piston 66. When the piston 66 is forced into the cylinder 54 towards the intake port 72 the ball check valve 64 opens and allows viscous liquid material flow through said piston 66 and into the area within the cylinder 54 where the connecting rod 50 attaches with said piston 66. Since the volume displaced in front of the moving piston 66 is greater than that volume defined to the rear of the piston 66 due to the volume taken by the connecting rod 50, liquid material flows out of the discharge port 74 when the piston 66 is forced into the cylinder 54 towards the intake port 72. As the piston 66 retracts away from the intake port 72 the piston check valve 64 stays closed, forces the liquid in the volume having the connecting rod 50 out the discharge port 74, and further causes the intake check valve 65 to open and allow liquid material to enter the cylinder 54 from the intake port 72.

Upon exiting from each pump 29, each urethane constituent compound is fed into a separate "T" or branch connection having an entrance and two exiting ports. A first exiting port of each "T" connection is connected with its own pressure relief recirculating valve 19, 21 which allows recirculation into the respective holding tanks 12. The other "T" exiting port or second exiting port feeds the dispensing or mixing head 76 through a hose or pipe structure which is not affected by the compound within. For the preferred embodiment, an inline strainer or screen is utilized within the lines prior to the dispensing or mixing head 76 in order to filter particles within the constituent compounds. If manual recirculating valves 23 are utilized, when the recirculating valves 23 are closed, the dispensing or mixing head 76 is pressurized and ready for use. Pressure of said compounds is controlled by the hydraulic pressure supplied by the hydraulic drive cylinder 32. Said dispensing or mixing head 76 allows for each of said compounds to enter said head 76, thoroughly mix within the static mixer 78, and exit from said static mixer 78 nozzle into a void.

When actuation and use of the dispensing or mixing head 76 is desired, the aforesaid manual recirculation valves 23 (if utilized) in the recirculation hoses are closed, thereby preventing recirculation into the holding tanks 12 and providing maximum compound pressure into the dispensing or mixing head 76. Again, in a preferred embodiment, said pressure is controlled by the hydraulic pressure fed to the hydraulic drive cylinder 32. Upon actuation of said dispensing or mixing head 76 for a preprogrammed user determined amount of time, each of said compounds which enter said dispensing or mixing head 76 is allowed to enter a static mixer 78 of said mixing head 76 and thereafter be ejected into the area or volume in which said urethane is required.

For the preferred and alternative embodiments, a cable brush 106 is pivotally positioned relative to the apparatus 10 carriage 100 movement in order to remove rocks and debris from the railroad ties. The cable brush 106 comprises a brush body 128 having a plurality of slots or grooves 129 into which sections of aircraft type metallic cable 125 are placed and held, preferably via an overlapping plate 130. Alternative embodiments may utilize cables 125, ropes, or rods of alternative materials such as nylon, hemp, straw, or other polymers. The cable brush 106 is rotatably mounted with a mounting bracket 126 and the bracket 126 is mounted with the carriage 100 or other portions of the apparatus 10 as found desirable for the operator. The cables 125 comprise a plurality of preferably a metallic cables which are rugged and durable and individually replaceable when worn. The cable brush 106 is driven or rotates via a brush drive 127 which includes a motor and chain, gear, or belt drive coupling. A removable pivot pin 131 allows the cable brush 106 to pivot whereby debris may be directed from the ties in a desired direction. For an alternative embodiment, a debris blower 97 is provided near or on said mixing head 76 or the carriage 100 in order to clean the area onto which the urethane is applied. The debris blower 97 is a centrifugal or other type of high volume air blower connected with a tube or hose and utilized to blow rocks and other debris from the railroad track area prior to tie void filling.

Referring to FIGS. 20-30, the mixing head 76 assembly, also known as the urethane dispensing gun head or dispensing head assembly, is comprised of two or more compound entrance holes 84 on the valving block 86 which feed through to two or more mixture exiting holes 88 on the mixing head 76 and which further feed the static mixer 78. Said assembly is further comprised of two or more compound chambers 85 within the mixing head 76, said static mixer 78, a compound valve actuator 90, typically an electrically controlled pneumatic cylinder, and two or more compound valves 92, also typically known as needle or pin throttle valves, slidably engaged and sealed within bores 91. In the preferred embodiment, the static mixer 78 is placed over said mixture exiting holes 88 via the use of an adaptor 94 which allows the static mixer 78 to be threadedly engaged over said exiting holes 88. Alternative embodiments may attach said static mixer 78 in any manner which allows urethane components to flow and mix therethrough. Within the static mixer 78, as understood within the arts, is a unique helix structure that ensures constant turbulence so that any compounds forced through it are thoroughly mixed together. The two part urethane exits the static mixer 78 open end 81 as a mixed urethane and is ready for placement or insertion into voids or cavities.

In a preferred embodiment, each valve pin 69 contains an attached end 73 and a reduced end 75. Each attached end 73 is attached at an external portion of the mixing head 76 to a common valve head 49 which in turn is attached to the compound valve actuator 90. Alternative embodiments may eliminate the valve head 49 and attach each pin 69 to a separate actuator 90. The reduced end 75 is opposite the attached end 73 and mates with the valve O-rings 95 when the mixing head 76 is not activated in order to ensure a positive seal for each compound. In a preferred embodiment, the reduced end 75 at the tip 93 is uniquely positioned on the valve pin 69 and of sufficient length that it may extend slightly into the respective mixing block 83 compound chambers 85 when the mixing head 76 is not activated or actuated. (i.e. when the valve actuator 90 is not actuated) This ensures that the valve bores 91 remain unclogged. The diameter and length of the reduced end 75 is determined by the internal diameter of the O-ring 95 chosen.

The valve pins 69 fit within each respective valve housing 51 and each assembly of the valve housing 51 and pin 69 is inserted within the respective valve bore 91 for each. The valve housings 51 contain packing, O-ring, and other materials to provide bearing and sealing surfaces for each valve pin 69 within each bore 91. That is, the valve housings 51 function somewhat as packing within a water faucet operates to prevent liquid from escaping from the faucet. The housings 51 also serve to guide and align the valve pins 69 within the bores 91. In a preferred embodiment, the valve housings 51 are manufactured from a Teflon® and neoprene rubber O-ring material but may be manufactured from any material which is capable of sealing and also withstanding the working pressures and compounds.

As further described herein, each component, chamber 85, passage, or compound valve 92 is sealed with the necessary seals, gaskets, O-rings, or interface to prevent leakage or unintended mixing of the constituent urethane compounds. In combination with such, each compound entrance hole 84 provides for the entrance of each constituent compound through the valving block 86 and into the mixing head 76 and also into its respective compound chamber 85 without leakage. If said compound valves 92 are actuated by said valve actuator 90, each of said pressurized compounds are allowed to enter said mixing head 76 and each exit through its own mixture exiting hole 88 into said static mixer 78. By providing separate mixture exiting holes 88, the constituent compounds are prohibited from mixing until such time as each enters the static mixer 78. This minimizes the probability of blockages or injection of a compound into an opposite compound chamber 85.

The preferred embodiment further seals the tips 93 of the needle valves 92 with O-rings 95 which are preferably manufactured of TEFLON or another material which is not affected by the compounds. Said O-ring 95 seal ensures that compounds do not enter the needle valve 92 body and cause it to stick. Furthermore, although a preferred embodiment allows for the actuation of said valves 92 with an electrically controlled pneumatic cylinder as a valve actuator 90, alternative embodiments may also provide for electric solenoidal, motor, or hydraulic control. The needle or pin type valves 92 of the aforementioned mixing head 76 provide reliable operation even if the urethane components are highly viscous.

FIGS. 27-30 show the respective cross sections of the valving block 86, seal plate 96, and mixing block 83. The seal plate 96 fits and sandwiches between the valving block 86 and the mixing block 83 and provides the recesses necessary to hold and sandwich the aforementioned valving O-rings 95 in place. Alternative embodiments may utilize other forms for securing said O-rings 95 such as recesses in the valving block 86 or mixing block 83 and forego use of the seal plate 96 altogether. From the aforesaid figures, it is shown that each constituent compound enters the valving block 86 and flows through passages within the seal plate 96 into the mixing block 83 when said valves 92 are opened. Said compounds then exit through the static mixer adaptor 94 and into the static mixer 78, thereafter exiting the open end 81 as a mixed compound.

The mixing head 76 further contains a solvent injection hole 87 which connects through a solvent passage 89 and a solvent check valve 99 to the compound chambers 85. The check valve 99 allows solvent, typically a di-basic ester, and air to enter one or more of the compound chambers 85 and static mixer 78. This ensures that during operation of the mixing head 76 no urethane mixture will enter the solvent passage 89 or solvent and air injector 103 system. When actuated, the solvent and air injector 103 injects a solvent or air or both into one or more of the compound chambers 85 thereby cleaning the compound chamber(s) 85, the tips 93 and reduced ends 75 of the valve pins 69, the mixture exiting hole(s) 88, and the static mixer 78. The solvent and air injector 103 is connected to the solvent injection hole 87 with a solvent and air injector hose 105. In a preferred embodiment, the injector 103 utilizes a Versa-Matic® pump by VM Pump™ but any pump which is non-reactive to the solvents will function. The hose 105 contains one or more solvent and air injector valve(s) 107 which allow solvent and air injection to be turned on or off. As expected, the solvent and air injector valve(s) 107 remain closed during actuation of the mixing head 76. The preferred embodiment of the present art apparatus 10 also utilizes an automatic solvent flush system which automatically flushes the compound chambers 85 and static mixer 78 if an operator fails to do so within a preset amount of time. For the preferred embodiment, this auto flush feature is triggered approximately 13 seconds or upon a predetermined time after the last use of the apparatus 10 with alternative embodiments utilizing a lesser or greater amount of time.

The timer of the present art, preferably electronic, allows for an electrical pulse of preprogrammed pulsewidth to control the opening and closing time of the compound valves 92 through said valve actuator 90 in order to provide a desired volume mix output. (For a preferred embodiment, the timer is a model 365A manufactured by Automatic Timing & Controls of Lancaster, Pa.) That is, if the pressure and flow rate is controlled by the synchronous pumps 28, the amount of compound which is mixed and delivered through the static mixer 78 is simply a linear function of how long the compound valves 92 are left open. In a preferred embodiment said pulsewidth is programmable from 0.1 to 3 seconds but may be configured for shorter or longer user desired pulsewidths. When the operator pushes an activation switch 109 to energize said timer, the electrical pulse from said timer opens or energizes the electric valve 101 which supplies pressurized flair to the valve actuator 90 in order to open the valves 92 in the dispensing head 76. Said electric valve 101 is a Humphrey® model 410 in a preferred embodiment although any two way valve with exhaust may be substituted. When said timer de-energizes or closes said electric valve 101, compressed air is transferred to the other side of the air cylinder of the valve actuator 21 in order to force said valves 92 into a closed position. In the preferred embodiment, any time that one side of the air cylinder of the valve actuator 21 is pressurized, said electric valve 101 vents the other side to atmosphere. Those skilled in the art will appreciate that electrical timers are a staple item which are manufactured in many forms and use a variety of different technologies. The timer is commercially available and is claimed only in conjunction with the system described herein.

The valve actuator 90 is capable of providing a positive force for opening and closing the compound valves 92. When the valve actuator 90 is pneumatic, two air flow hoses are provided to the pneumatic cylinder of the actuator 90, typically a pancake or other type of air cylinder, to provide positive and negative force and movement upon the compound valves 92. The electric valve 101 allows for one air flow hose to exhaust while the other hose is pressurized. Furthermore, in the preferred embodiment, the valve actuator 90 is spring loaded to provide a default closure of the compound valves 92 if necessary.

As described, the valve actuator 90 is typically a double acting pneumatic cylinder which is capable of forced operation in both a positive and negative direction along the axis of the cylinder. That is, it has two inlet ports for air introduction, each port acting to force the piston of the cylinder in an opposite direction. In a preferred embodiment, a Bimba® #CFO-07574 air cylinder is used, but any air cylinder which provides enough force to open said valves 92 may be used. The actuator 90 is attached to the structure of the mixing head 76 and its piston is attached to the valve head 49. Thus, movement of the piston forces the valve head 49 and its attached valve pins 69 to move, thereby providing for closing or opening of said reduced ends 75 with said valve O-rings 95 within said valve bores 91. In a preferred embodiment, a return spring 109 is provided between the mixing head 76 and the valve actuator 90 and further opposite the valve head 49, in order to ensure positive closing of the valves 92 should the compressed air supply 111 fail.

Alternative embodiments may replace the timer with a manual electrical switch which turns the electric pneumatic valve 101 on and off manually. Further alternative embodiments may replace the electric pneumatic valve 101 with a manual air valve which actuates the valve actuator 90. Even further alternative embodiments may replace the valve actuator 90 with a solenoid or motor drive for valve head 49 actuation. Further alternative embodiments may utilize a manual valve actuator which opens and closes the valves 92 via the mechanical movement provided by the user. All of the aforesaid may be used with the present art without departing from the spirit of the present art.

As aforesaid, the recirculation system preferably comprises two or more hoses with inline pressure relief valves 19, 21 which are attached with "T" fittings before the compound entrance holes 84 and feed unmixed compound back into the respective holding tanks 12. Recirculation ensures temperature control of the constituent compounds. As aforesaid, each recirculation hose of the alternative embodiment contains its own recirculation valve 19, 21, 23 which is capable of regulating, controlling, and directing the recirculation flow. Said manual valves 23 are manually closed prior to actuating said mixing head 76 in order to apply full pressure to the mixing head 76 and the pressure relief valves 19, 21 automatically allow recirculation thereafter.

The present art further incorporates a terrain drive 98 on one or more sides (preferably each side) of the carriage 100, each having preferably rubber tires. Each terrain drive 98 may be lowered or raised via the action of a hydraulic cylinder 102 and allow the carriage 100 to move along a railroad bed. The terrain drives 98 are typically driven by hydraulic motors, although alternative embodiments may utilize other types of motors, and allow the carriage 100 to be driven when the drives are lowered. The carriage 100 further incorporates rail followers 104 on each side of the carriage center axis which may be lowered onto a railroad rail of a railroad bed and follow said rail when the terrain drives 98 are moving the carriage 100. A unique feature of the present apparatus is the placement of a rail follower 104 near the center axis of the machine whereby the carriage 100 and apparatus 10 may be guided by a railroad rail mounted on or near the center of the railroad track plane.

In operation, the operator positions the carriage 100 along a railroad bed near a railroad tie which requires a void or cavity filled and actuates the cable brush 106 or debris blower 97 in order to clean the application area. The apparatus 10 is powered on and allowed sufficient time for the heating portions 17, 18, 25 and pumps 28, 111 to begin operation and circulate and sufficiently heat the constituent urethane foam mixture portions. The operator then places the exiting tube portion or open end 81 of the static mixer 78 into the area or volume which requires the urethane mix. When urethane application is desired, the user triggers the timer via the activation switch 109. Upon triggering of the timer, an electrical pulse is created which actuates the electrically controlled pneumatic valve 101 which allows compressed air to pressurize the compound valve 92 air line for compound valve 92 opening and exhausts to atmosphere the compound valve 92 air line for closing. The compressed air thus supplied to the pneumatic valve actuator 90 thereby opens the compound valves 92. When open, the compound valves 92 allow a predetermined volume of each compound to enter the mixing chamber 79 or static mixer 78. The compounds are then mixed within the static mixer 78 through the turbulent flow provided by said static mixer 78. Thereafter, the mixed compound exits the open end 81 of the static mixer 78 as a urethane mixture. When not injecting a urethane mix, the pressure relief valves 19, 21 open due to the increase in compound line pressure in order to provide compound recirculation for optimum temperature and viscosity control.

Upon completion, the operator utilizes the terrain drives 98 to move the apparatus 10 to the next desired location and repeats the process.

From the foregoing description, those skilled in the art will appreciate that all objects of the present invention are realized. An apparatus and method for optimally mixing and injecting a two part urethane foam along with its unique mixing head is shown which is particularly adapted for filling holes and cavities, especially holes left within railroad ties due to railroad spikes. Those skilled in the art will appreciate that the art of the present invention as selected provides a precisely controlled amount of urethane in a time efficient manner without mixing head clogging, all in a way which heretofore was unavailable.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. An apparatus for optimally mixing and injecting a two part urethane foam into or onto a railroad tie, comprising:
    a dispensing and mixing head; and
    two or more holding tanks each holding one or more portions of a urethane foam mixture compound which when said portions are mixed, via an actuation of said dispensing and mixing head, react to produce a urethane foam; and
    said two or more holding tanks having an exiting port; and
    one or more heating elements positioned to uniformly heat one or more of said portions of said urethane foam mixtures to a temperature wherein a viscosity is reduced and a proper reaction time is obtained; and
    two or more synchronously coupled pumps each having an intake port capable of suction feeding said portions of said urethane foam mixture; and
    said synchronously coupled pumps each having a discharge port and capable of positive pumping said portions of urethane mixture through said discharge port, each intake port connected with one of said holding tank exiting ports; and
    said discharge ports each connected with said dispensing and mixing head and one or more pressure relief valves which recirculate each portion of said urethane foam mixture into the holding tank of origination if said dispensing and mixing head is not actuated; and
    said dispensing and mixing head having two or more compound valves connected with a valve actuator; and
    said compound valves each having the form of a valve pin within a bore with an attached end connected with said valve actuator and a tip end which mates with one or more seals between said bore and a compound chamber, said seal preventing said portions of said urethane mixture from entering said compound chambers when said valve actuator is not actuated; and
    said dispensing and mixing head having at least two compound entrance holes into which each of said portions of said urethane mixture enters said head from said discharge ports via an action of said pumps, and upon actuation of said valve actuator, separately enter said compound chambers and exit two or more mixture exiting holes into a static mixer sealingly connected with said head and exit an open end of said static mixer to produce a thorough urethane mix capable of reacting to produce a urethane foam; and
    a solvent injection hole within said dispensing and mixing head connected with a solvent passage which is further connected with one or more of said compound chambers; and
    a cleaning solvent capable of flushing one or more of said portions of said urethane foam mixture compounds; and
    a solvent injector having a solvent injector valve and a solvent check valve; and
    said solvent injector valve allowing said cleaning solvent injection into said head and said static mixer after said actuation of said valve actuator; and
    said solvent check valve substantially prohibiting one or more of said portions of said urethane foam mixture from entering said solvent passage.

2. The apparatus for optimally mixing and injecting a two part urethane foam into or onto a railroad tie as set forth in claim 1, whereby:
    one or more of said tips of said valve pins having a portion which slightly extends into one or more of said compound chambers when said valve actuator is not actuated whereby said valve bores remain substantially unclogged.

3. The apparatus for optimally mixing and injecting a two part urethane foam into or onto a railroad tie as set forth in claim 2, whereby:
    said solvent injector valve automatically actuates after a period of time after actuation of said valve actuator.

4. An apparatus for optimally mixing and injecting a two part urethane foam into or onto a railroad tie, comprising:
    a dispensing and mixing head; and
    two or more holding tanks each holding one or more portions of a urethane foam mixture compound which when said portions are mixed, via an actuation of said dispensing and mixing head, react to produce a urethane foam; and
    said two or more holding tanks having an exiting port; and
    one or more heating elements positioned to uniformly heat one or more of said portions of said urethane foam mixtures to a temperature wherein a viscosity is reduced and a proper reaction time is obtained; and
    two or more synchronously coupled pumps each having an intake port capable of suction feeding said portions of said urethane foam mixture; and
    said synchronously coupled pumps each having a discharge port and capable of positive pumping said portions of urethane mixture through said discharge port, each intake port connected with one of said holding tank exiting ports; and
    said discharge ports each connected with said dispensing and mixing head and one or more pressure relief valves which recirculate each portion of said urethane foam mixture into the holding tank of origination if said dispensing and mixing head is not actuated; and
    said dispensing and mixing head having two or more compound valves connected with a valve actuator; and
    said compound valves each having the form of a valve pin within a bore with an attached end connected with said valve actuator and a tip end which mates with one or more seals between said bore and a compound chamber, said seal preventing said portions of said urethane mixture from entering said compound chambers when said valve actuator is not actuated; and
    said dispensing and mixing head having at least two compound entrance holes into which each of said portions of said urethane mixture enters said head from said discharge ports via an action of said pumps, and upon actuation of said valve actuator, separately enter said compound chambers and exit two or more mixture exiting holes into a static mixer sealingly connected with said head and exit an open end of said static mixer to produce a thorough urethane mix capable of reacting to produce a urethane foam; and a carriage capable of moving on or along a railroad bed and upon which said holding tanks and pumps are mounted; and a rotating cable brush having a plurality of extending cables mounted within a plurality of slots within a brush body and secured with one or more overlapping plates; and said cable brush having a mounting bracket mounted with said carriage and a brush drive providing a rotation to said cable brush wherein debris is removed from a railroad tie.

5. The apparatus for optimally mixing and injecting a two part urethane foam into or onto a railroad tie as set forth in claim 1, further comprising:

a carriage capable of moving on or along a railroad bed and upon which said holding tanks and pumps are mounted; and a rotating cable brush having a plurality of extending cables mounted within a plurality of slots within a brush body and secured with one or more overlapping plates; and said cable brush having a mounting bracket mounted with said carriage and a brush drive providing a rotation to said cable brush wherein debris is removed from a railroad tie.

6. The apparatus for optimally mixing and injecting a two part urethane foam into or onto a railroad tie as set forth in claim 1, further comprising:

a carriage capable of moving on or along a railroad bed and upon which said holding tanks and pumps are mounted; and a debris blower having an air blower mounted with said carriage wherein debris is removed from a railroad tie.

7. The apparatus for optimally mixing and injecting a two part urethane foam into or onto a railroad tie as set forth in claim 1, further comprising:

a carriage capable of moving on or along a railroad bed and upon which said holding tanks and pumps are mounted; and a debris blower having an air blower mounted with said carriage wherein debris is removed from a railroad tie.

8. The apparatus for optimally mixing and injecting a two part urethane foam into or onto a railroad tie as set forth in claim 1, further comprising:

a carriage upon which said two or more holding tanks and said two or more synchronously coupled pumps are mounted; and one or more raisable and lowerable terrain drives mounted with said carriage; and one or more rail followers mounted with said carriage whereby said carriage is driven by said terrain drive when lowered and said rail followers allow said carriage to follow one or more railroad rails.

9. The apparatus for optimally mixing and injecting a two part urethane foam into or onto a railroad tie as set forth in claim 1, further comprising:

a carriage upon which said two or more holding tanks and said two or more synchronously coupled pumps are mounted; and one or more raisable and lowerable terrain drives mounted with said carriage; and one or more rail followers mounted with said carriage whereby said carriage is driven by said terrain drive when lowered and said rail followers allow said carriage to follow one or more railroad rails.

10. The apparatus for optimally mixing and injecting a two part urethane foam into or onto a railroad tie as set forth in claim 9, further comprising:

a carriage capable of moving on or along a railroad bed and upon which said holding tanks and pumps are mounted; and a rotating cable brush having a plurality of extending cables mounted within a plurality of slots within a brush body and secured with one or more overlapping plates; and said cable brush having a mounting bracket mounted with said carriage and a brush drive providing a rotation to said cable brush wherein debris is removed from a railroad tie.

11. The apparatus for optimally mixing and injecting a two part urethane foam into or onto a railroad tie as set forth in claim 9, further comprising:

a debris blower having an air blower mounted with said carriage wherein debris is removed from a railroad tie.

12. The apparatus for optimally mixing and injecting a two part urethane foam into or onto a railroad tie as set forth in claim 1, said pumps each further comprising:

a cylinder and piston combination of substantially equal diameter, said piston having an attached connecting rod and a connecting rod external end extending external to said cylinder; and one or more intake check valves positioned to allow said one or more portions of a urethane foam mixture to enter said cylinder through said intake port when said piston retracts away from said intake port; and one or more piston check valves positioned with said piston to allow said one or more portions of a urethane foam mixture to flow through said piston and into said cylinder where said connecting rod attaches with said piston when said piston is forced toward said intake port; and one or more hydraulic drive cylinders having a controlled hydraulic pressure and connected with said connecting rods via a yoke; and said piston check valves further positioned wherein said piston check valve within said piston opens as said piston moves toward said intake port and said piston check valve within said piston closes as said piston moves away from said intake port and said intake check valve within said intake port opens as said piston moves away from said intake port and said intake check valve within said intake port closes as said piston moves toward said intake port, whereby said one or more portions of a urethane foam mixture flows from said discharge port upon movement of said piston in either direction.

13. The apparatus for optimally mixing and injecting a two part urethane foam into or onto a railroad tie as set forth in claim 4, said pumps each further comprising:

a cylinder and piston combination of substantially equal diameter, said piston having an attached connecting rod and a connecting rod external end extending external to said cylinder; and one or more intake check valves positioned to allow said one or more portions of a urethane foam mixture to enter said cylinder through said intake port when said piston retracts away from said intake port; and one or more piston check valves positioned with said piston to allow said one or more portions of a urethane foam mixture to flow through said piston and into said cylinder where said connecting rod attaches with said piston when said piston is forced toward said intake port; and one or more hydraulic drive cylinders having a controlled hydraulic pressure and connected with said connecting rods via a yoke; and said piston check valves further positioned wherein said piston check valve within said piston opens as said piston moves toward said intake port and said piston check valve within said piston closes as said piston moves away from said intake port and said intake check valve within said intake port opens as said piston moves away from said intake port and said intake check valve within said intake port closes as said piston moves toward said intake port, whereby said one or more portions of a urethane foam mixture flows from said discharge port upon movement of said piston in either direction.

14. The apparatus for optimally mixing and injecting a two part urethane foam into or onto a railroad tie as set forth in claim 9, said pumps each further comprising:

a cylinder and piston combination of substantially equal diameter, said piston having an attached connecting rod and a connecting rod external end extending external to said cylinder; and one or more intake check valves positioned to allow said one or more portions of a urethane foam mixture to enter said cylinder through said intake port when said piston retracts away from said intake port; and one or more piston check valves positioned with said piston to allow said one or more portions of a urethane foam mixture to flow through said piston and into said cylinder where said connecting rod attaches with said piston when said piston is forced toward said intake port; and one or more hydraulic drive cylinders having a controlled hydraulic pressure and connected with said connecting rods via a yoke; and said piston check valves further positioned wherein said piston check valve within said piston opens as said piston moves toward said intake port and said piston check valve within said piston closes as said piston moves away from said intake port and said intake check valve within said intake port opens as said piston moves away from said intake port and said intake check valve within said intake port closes as said piston moves toward said intake port, whereby said one or more portions of a urethane foam mixture flows from said discharge port upon movement of said piston in either direction.

15. The apparatus for optimally mixing and injecting a two part urethane foam into or onto a railroad tie as set forth in claim 12, said pumps each further comprising:

one or more limit switches mounted near said yoke and capable of sensing one or more positions of said yoke; and a hydraulic valve actuated by said limit switches whereby a hydraulic fluid flows into a first portion and out of a second portion of said hydraulic cylinder thereby causing an extension rod to extend and when directed by said limit switches allows said hydraulic fluid to flow out of a first portion and into a second portion of said hydraulic cylinder thereby causing said extension rod to retract.

* * * * *

UNITED STATES PATENT AND TRADEMARK OFFICE
CERTIFICATE OF CORRECTION

| | | |
|---|---|---|
| PATENT NO. | : 8,075,302 B1 | Page 1 of 3 |
| APPLICATION NO. | : 12/651452 | |
| DATED | : December 13, 2011 | |
| INVENTOR(S) | : Luther W. McClellan | |

Figure 12:
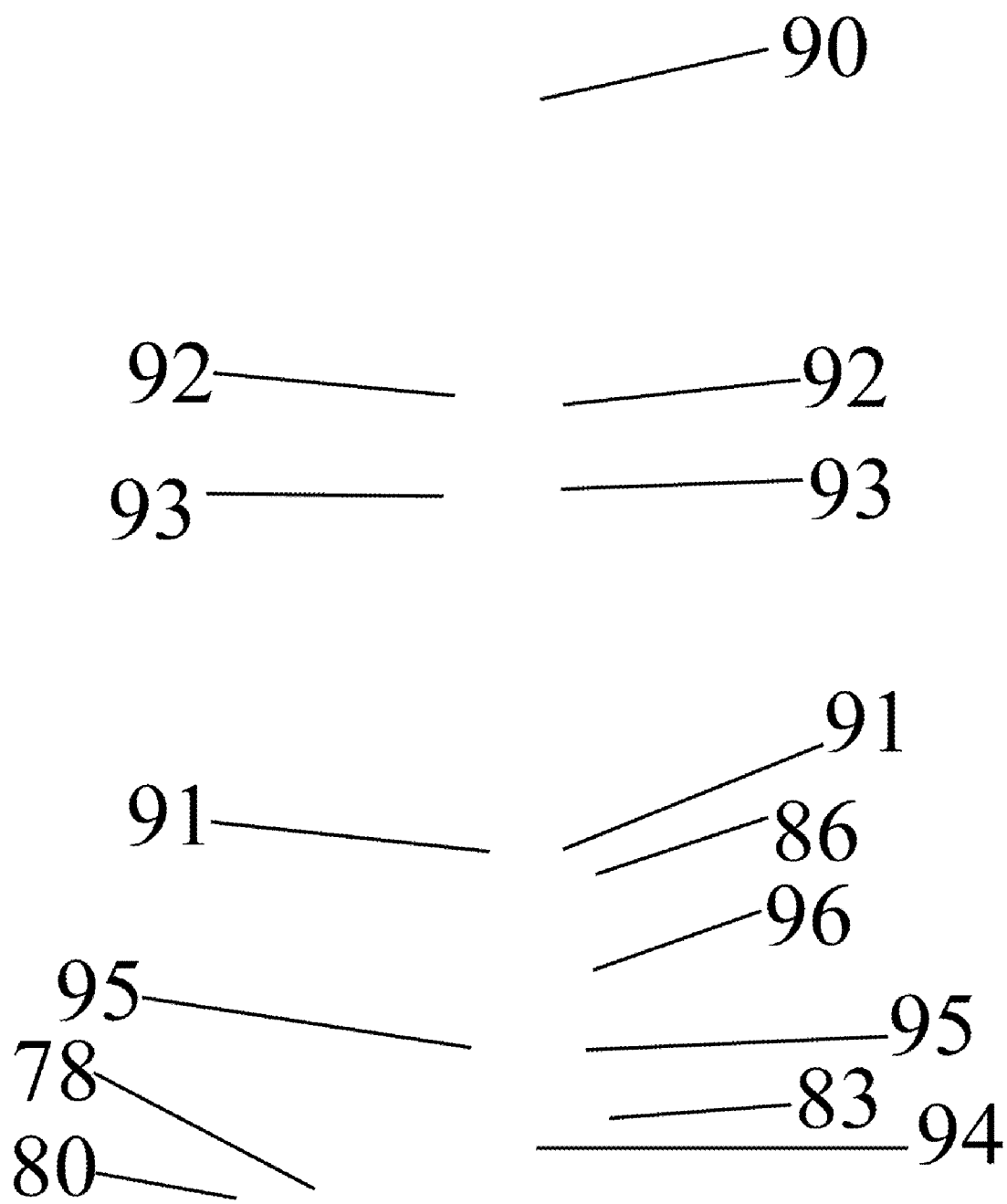
Figure 13:
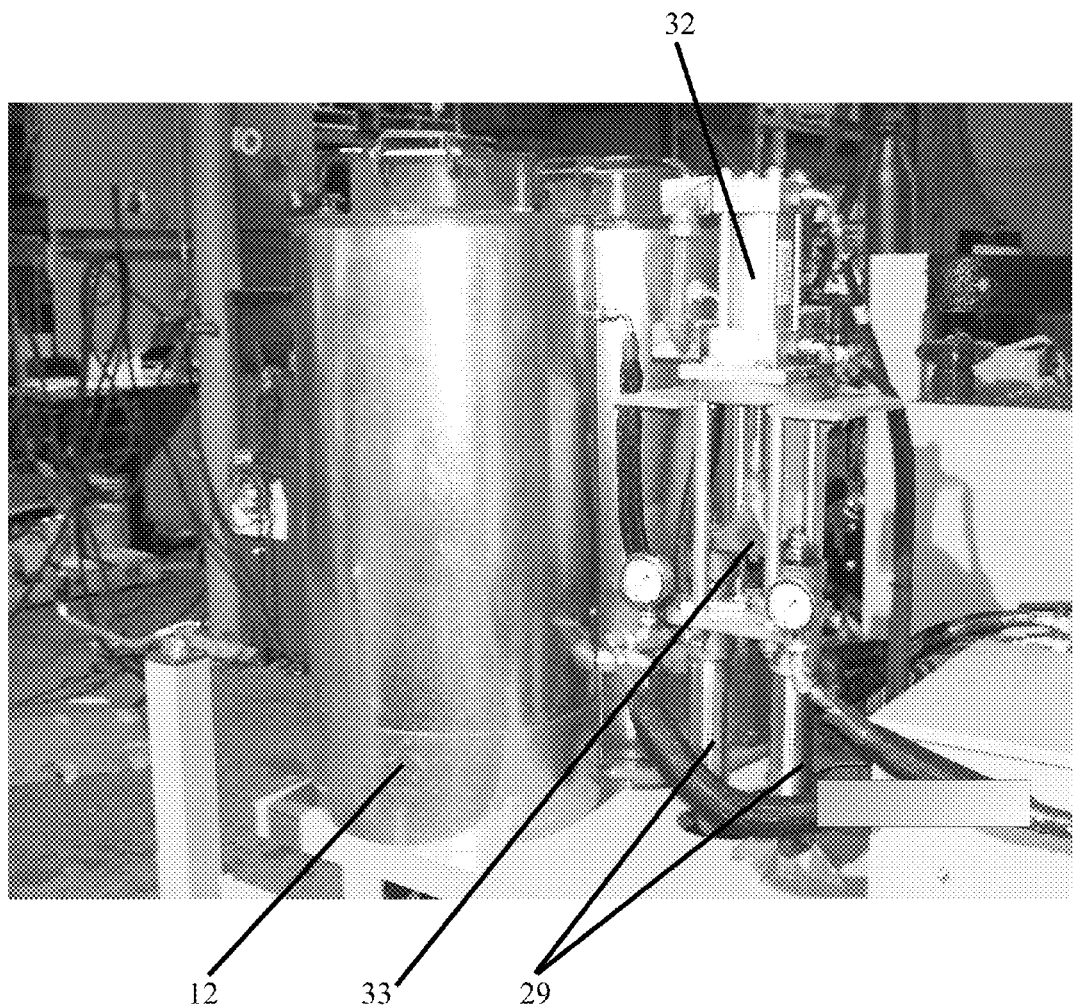
Figure 14:
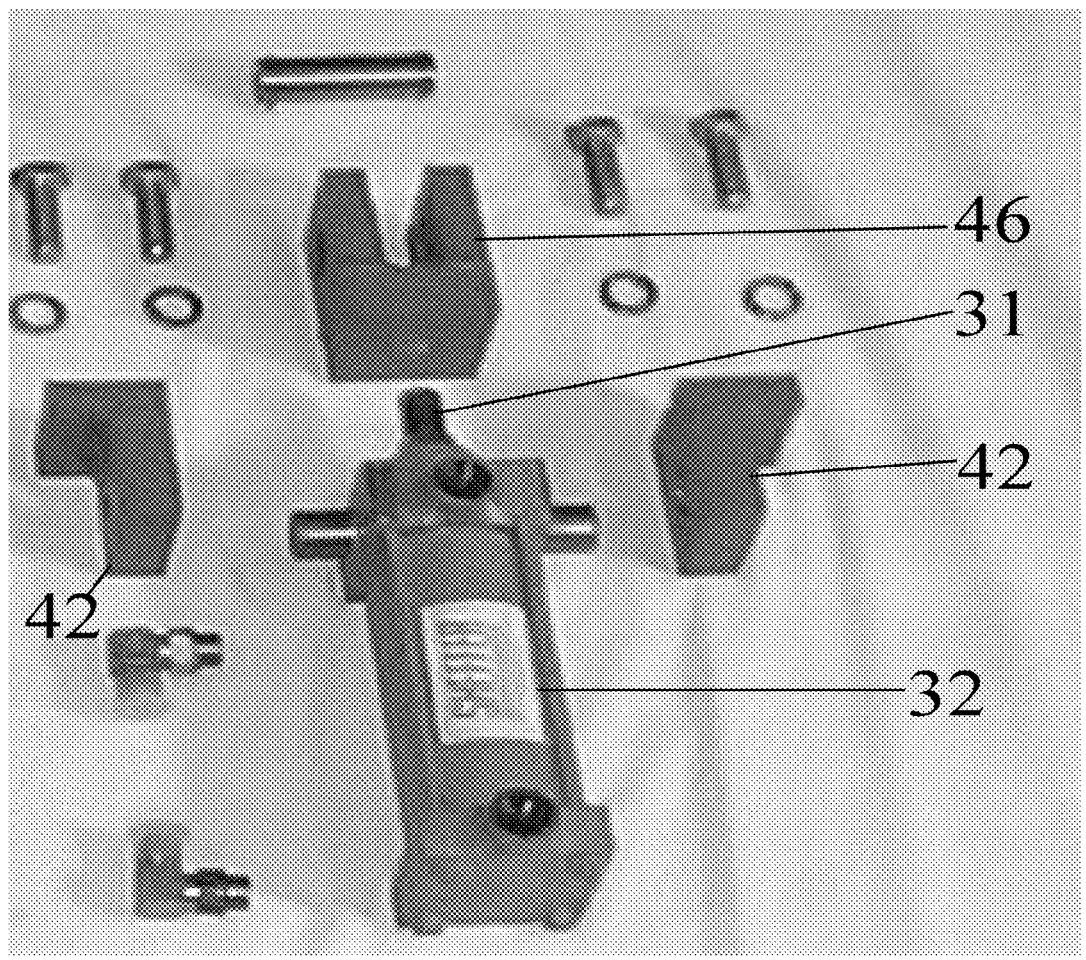
Figure 15:
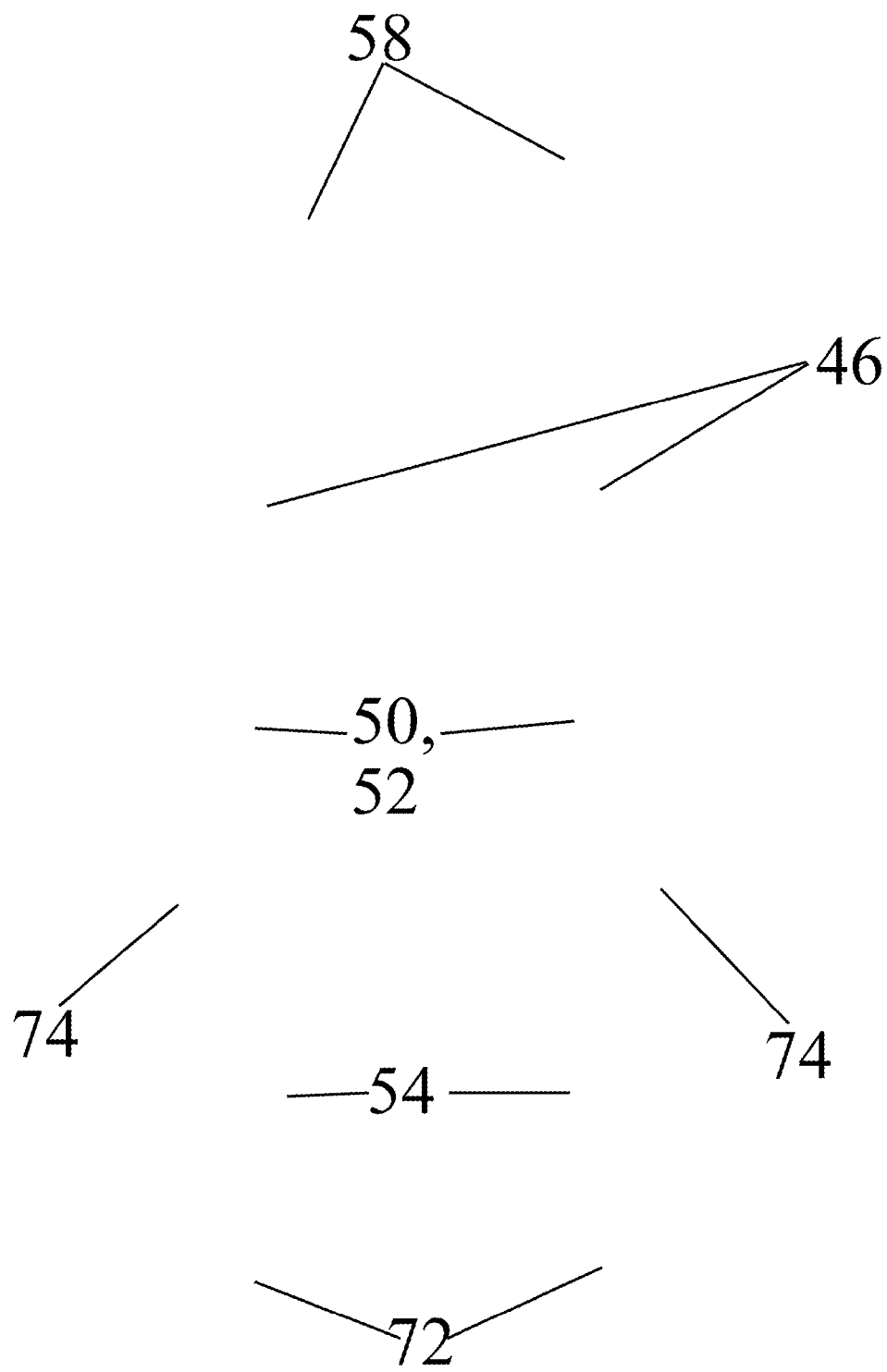
Figure 16:
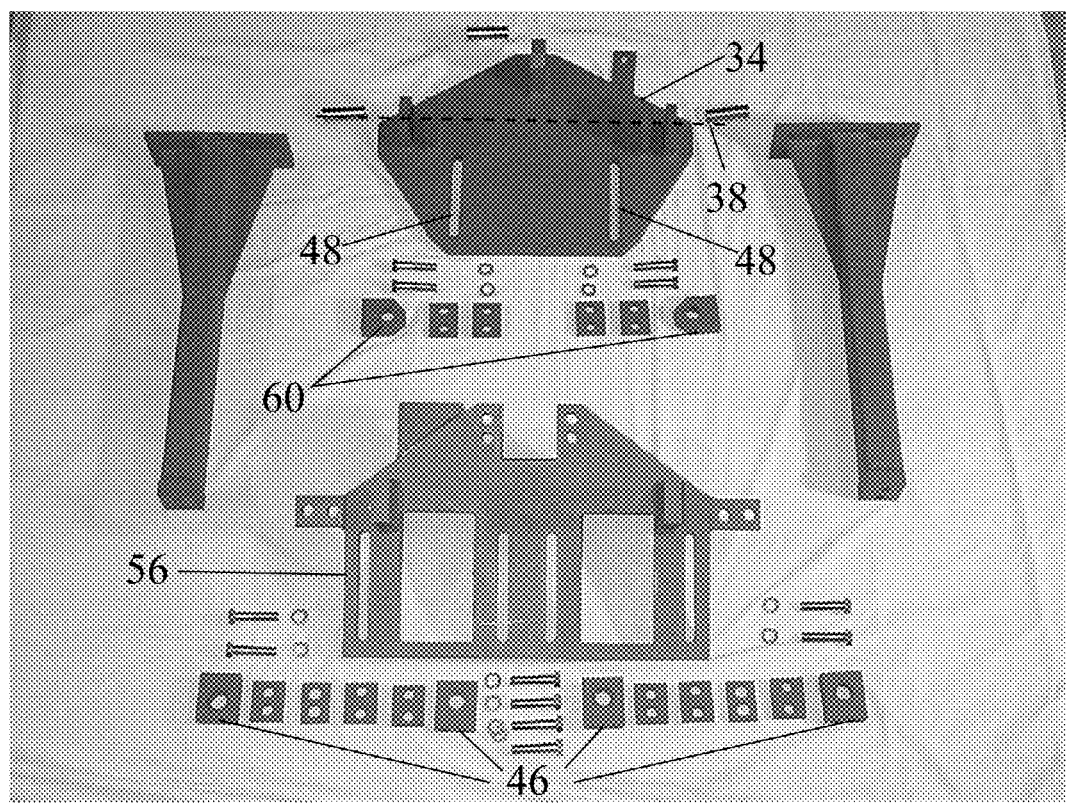
Figure 17:
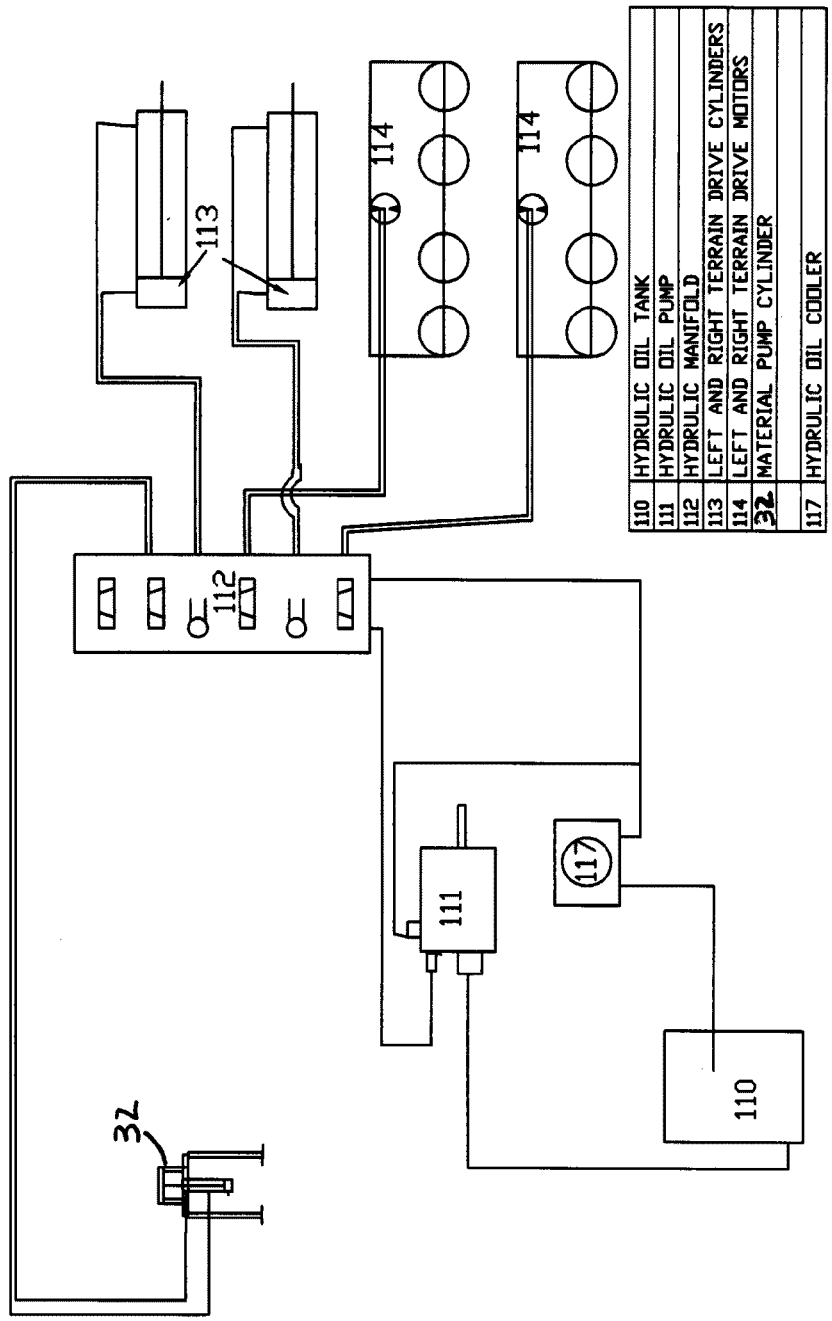
FIG. 17 is a schematic diagram of a preferred embodiment of the hydraulic flow within the apparatus with attached descriptions of the numerically identified components.
Figure 18:
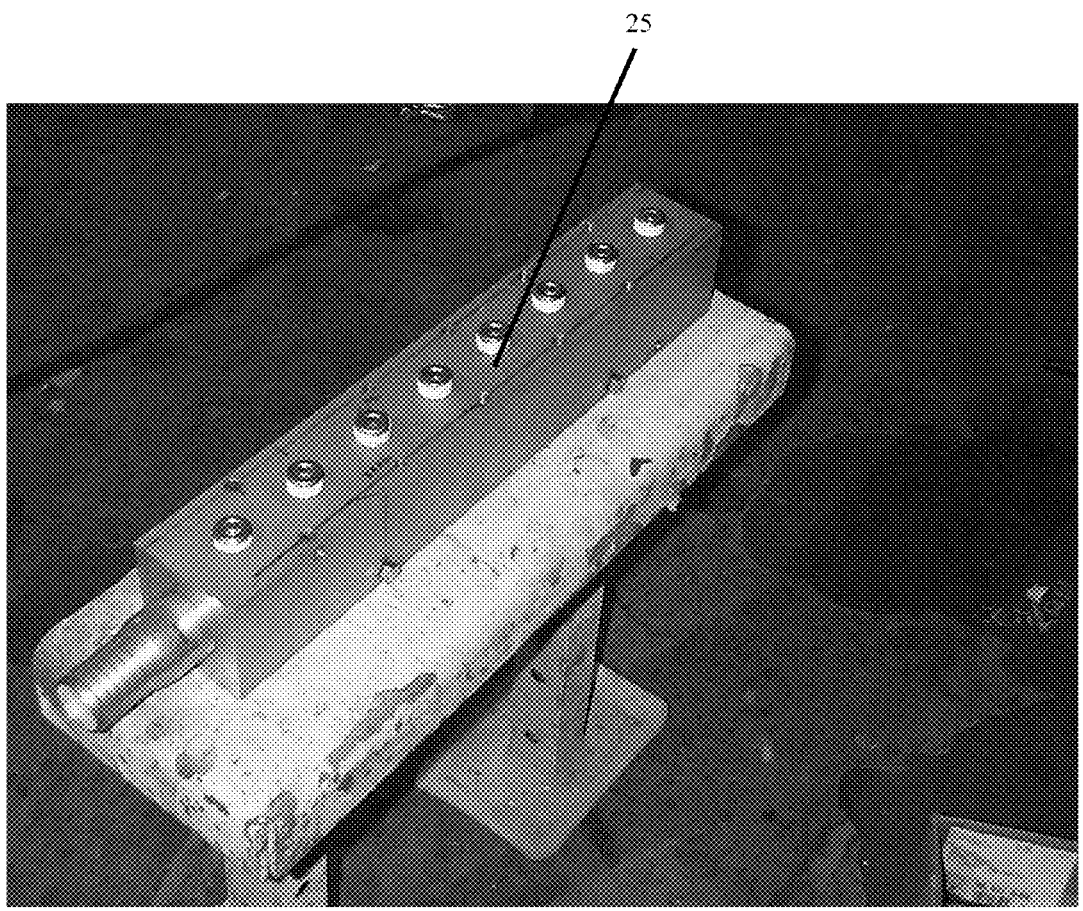
Figure 19:
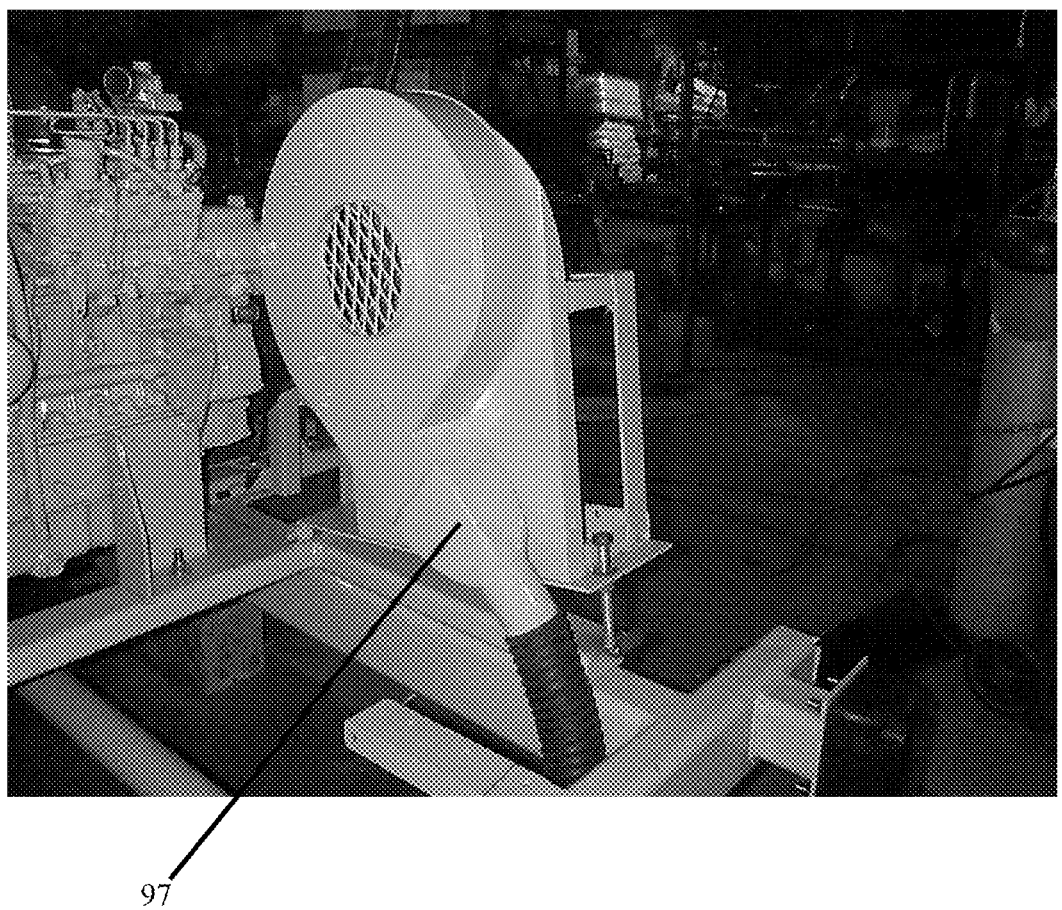
Figure 20:
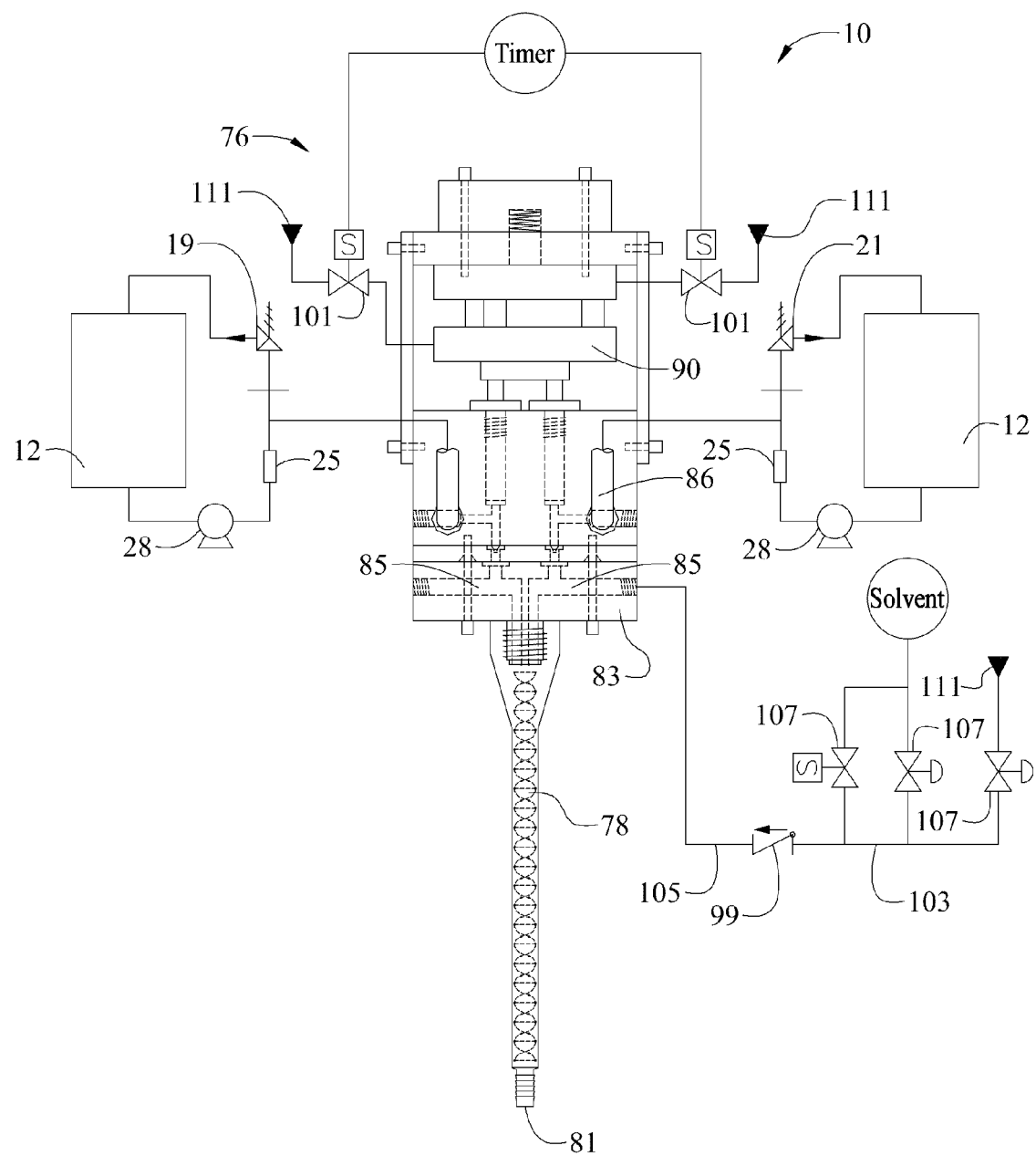
FIG. 20 is a block diagram of a preferred embodiment of an apparatus for optimally mixing and injecting a two part urethane foam which shows each component in relation to the mixing head.
Figure 21:
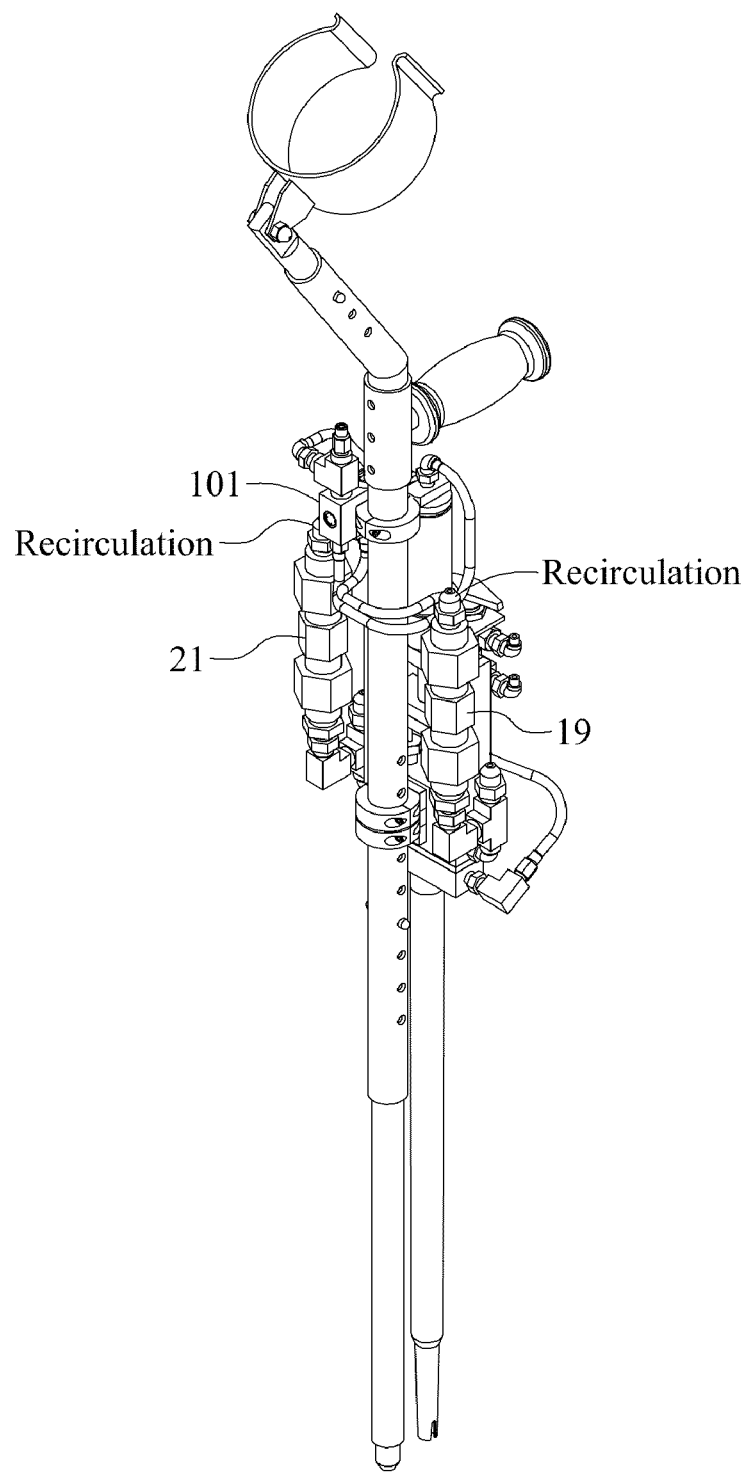
FIG. 21 is a rear perspective view of an alternative embodiment of the head and associated components mounted upon a frame.
Figure 22:
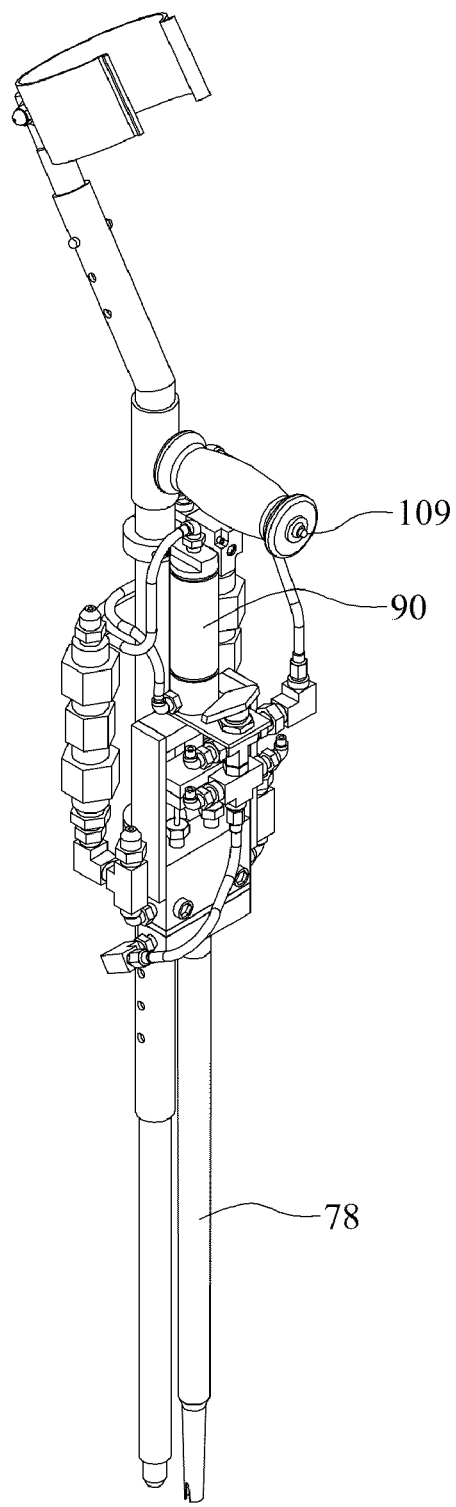
FIG. 22 is a front perspective view of an alternative embodiment of the head and associated components mounted upon a frame.
Figure 23:
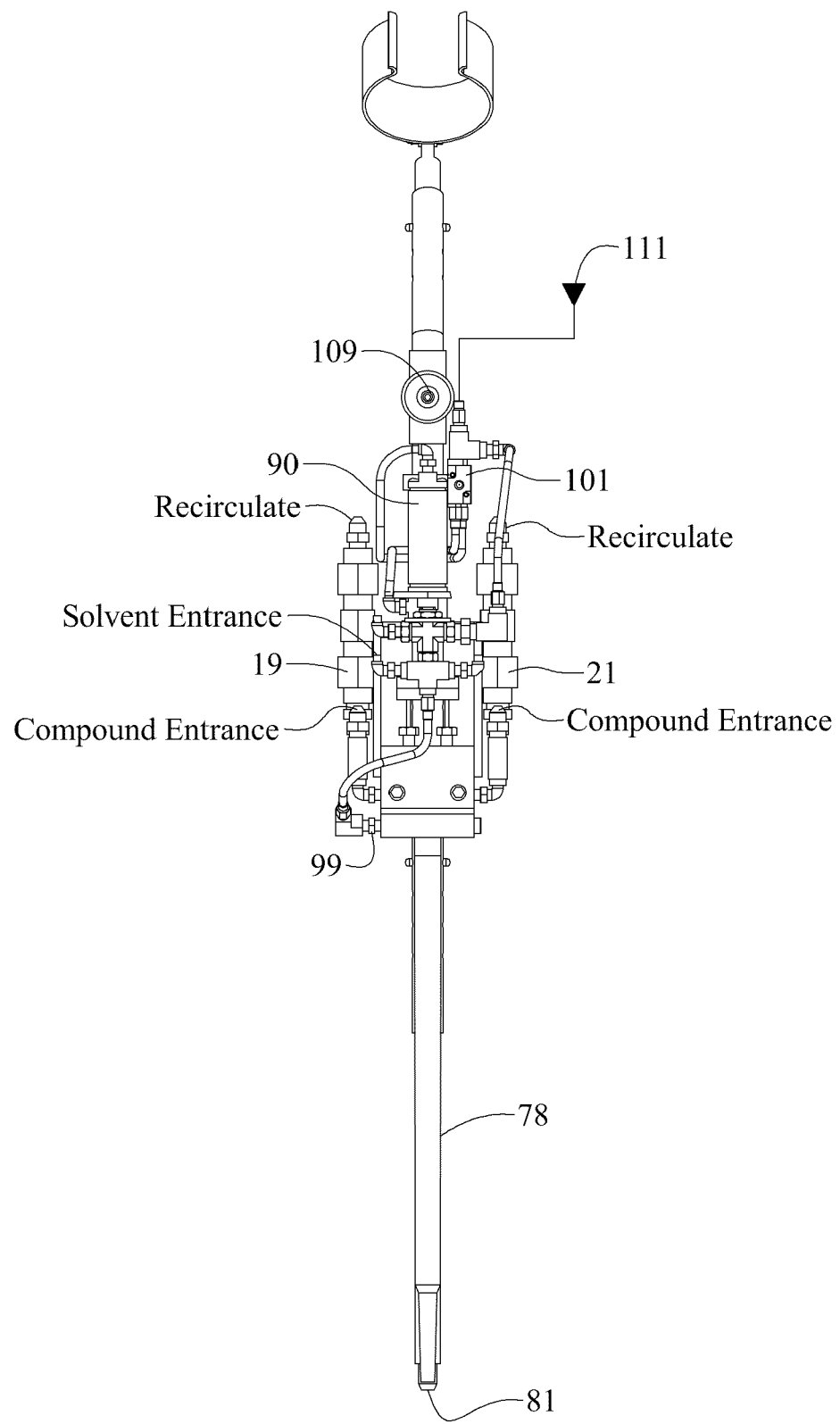
FIG. 23 is a front plan view of an alternative embodiment of the head and associated components mounted upon a frame.
Figure 24:
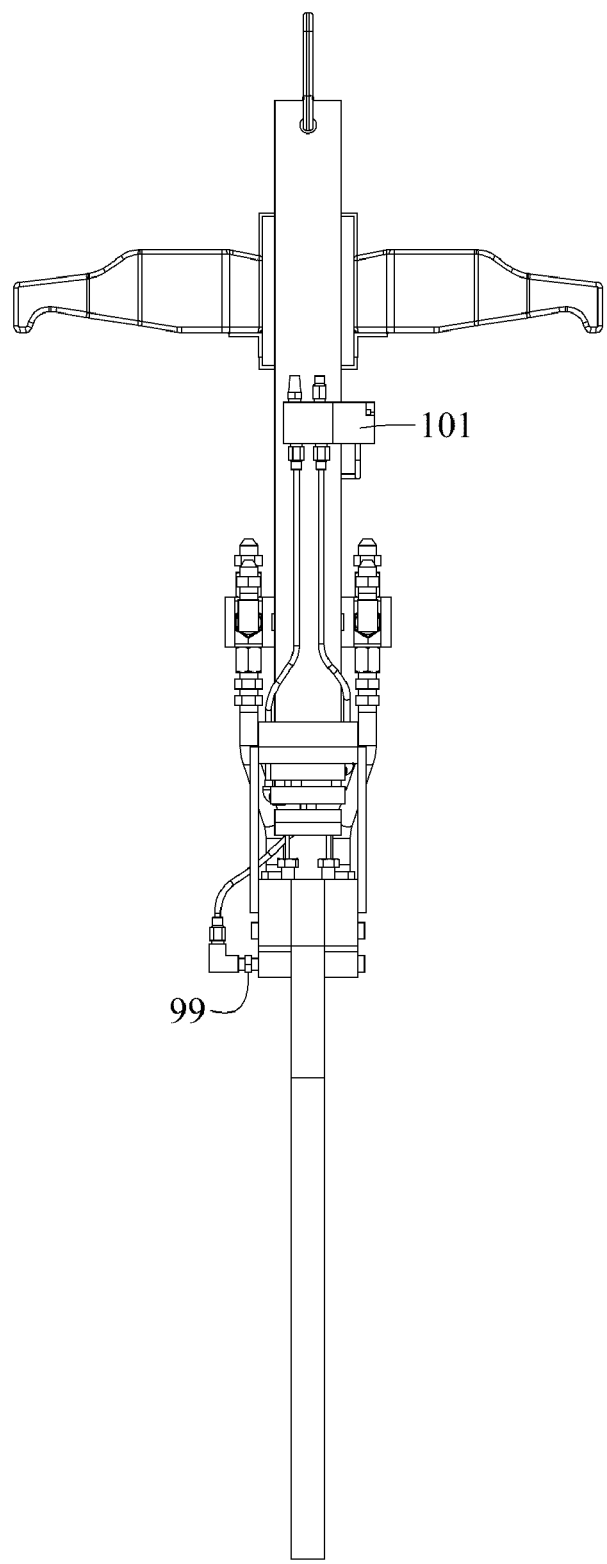
FIG. 24 is a rear plan view of a preferred embodiment of the head and associated components mounted upon a different frame than FIGS. 21-23.
Figure 25:
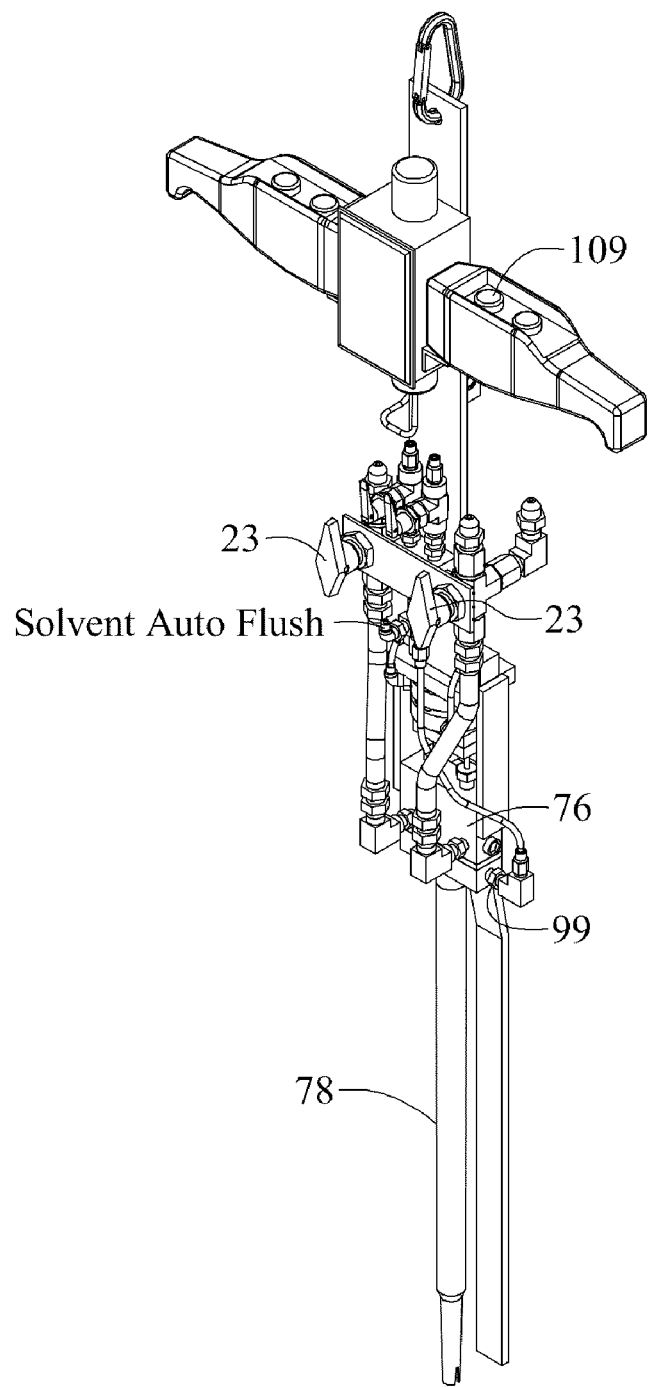
FIG. 25 is a front perspective view of the head and associated components mounted upon the frame of FIG. 24.
Figure 26:
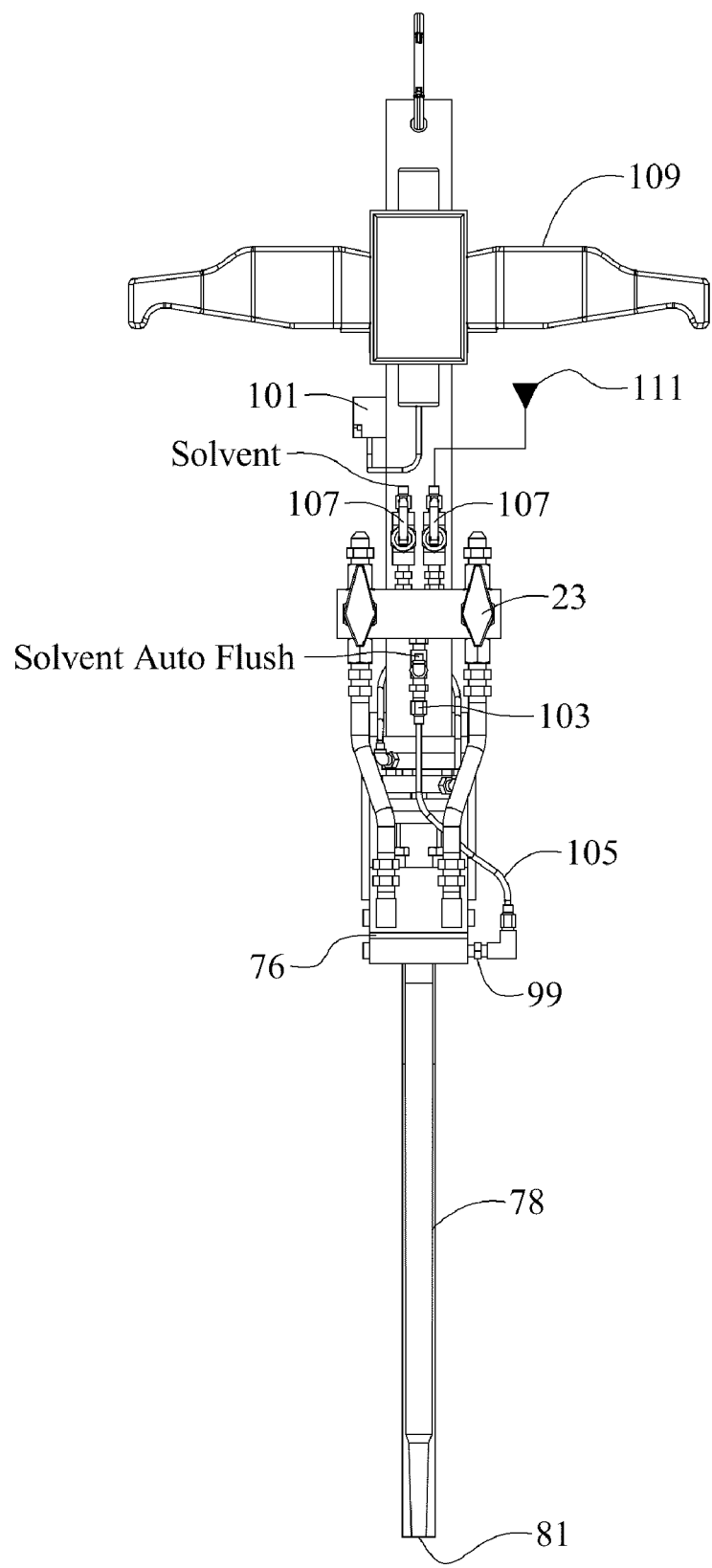
FIG. 26 is a front plan view of the head and associated components mounted upon the frame of FIG. 24.
Figure 27:
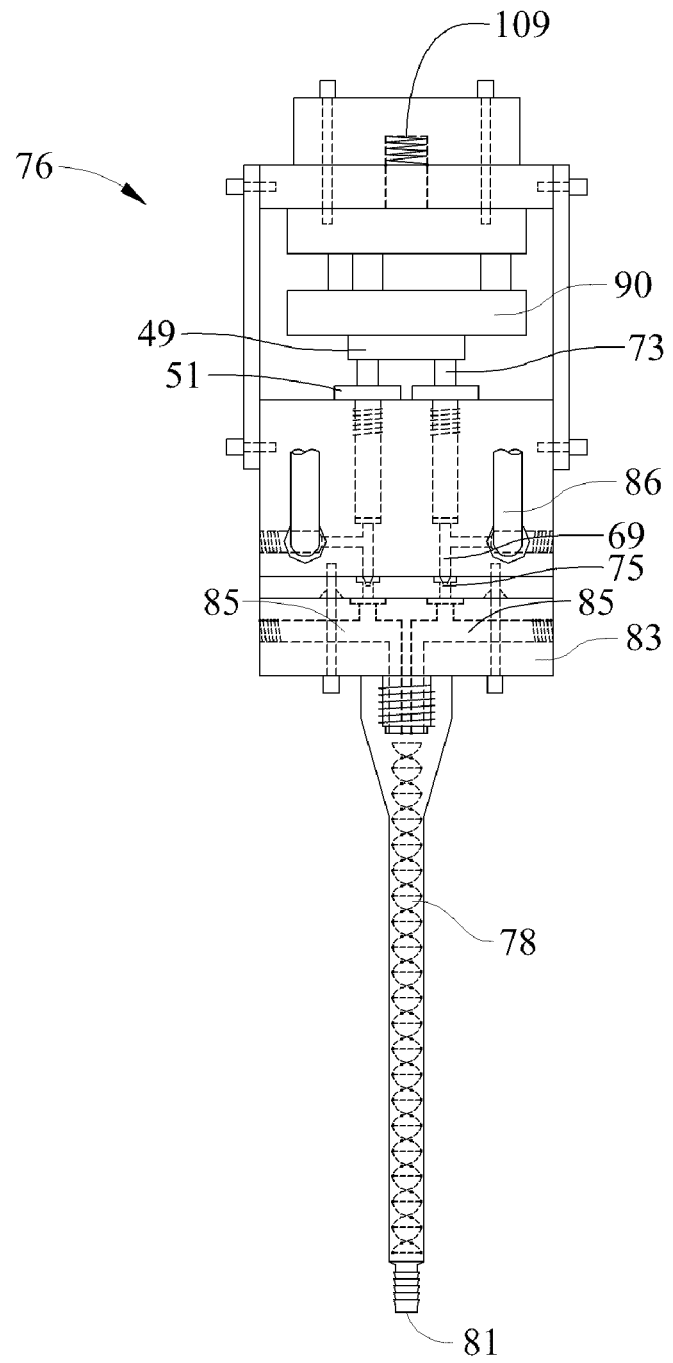
FIG. 27 is a front side plan view of a preferred embodiment of a mixing head for an apparatus for optimally mixing and injecting a two part urethane foam which further shows internal passages and components in phantom.
Figure 28:
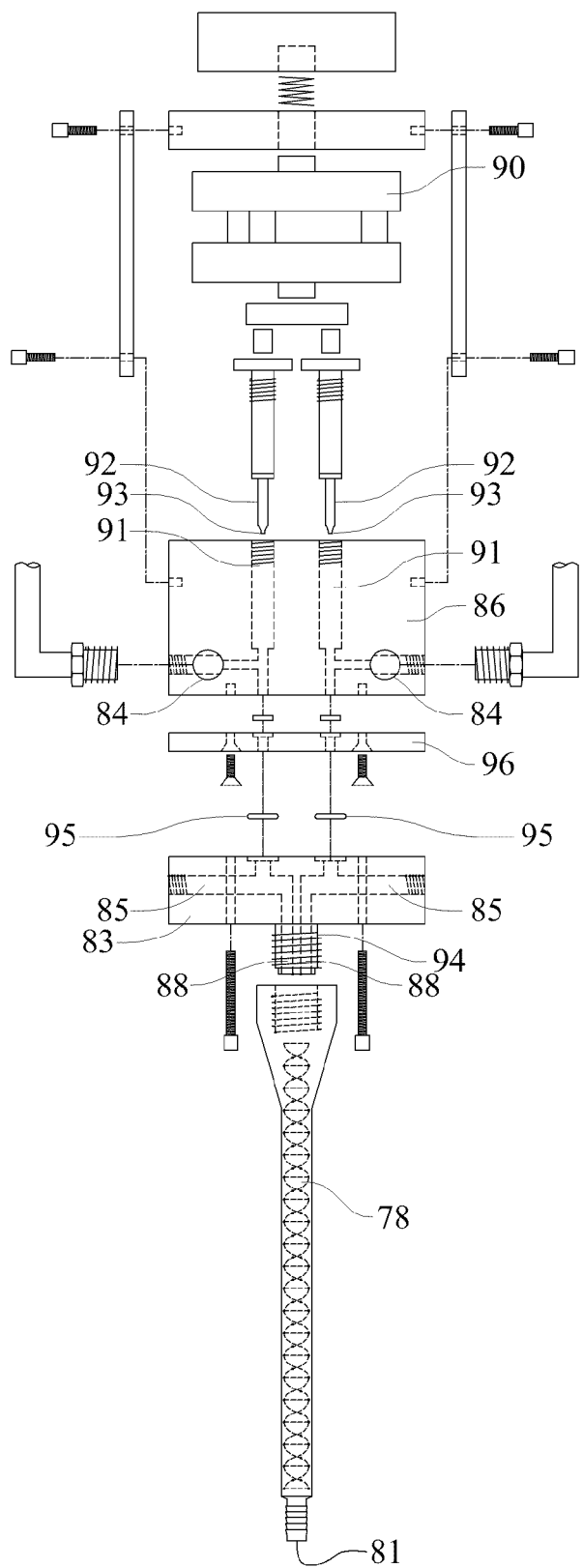
FIG. 28 is an exploded view of a preferred embodiment of a mixing head for an apparatus for optimally mixing and injecting a two part urethane foam which further shows internal passages in phantom.
Figure 29:
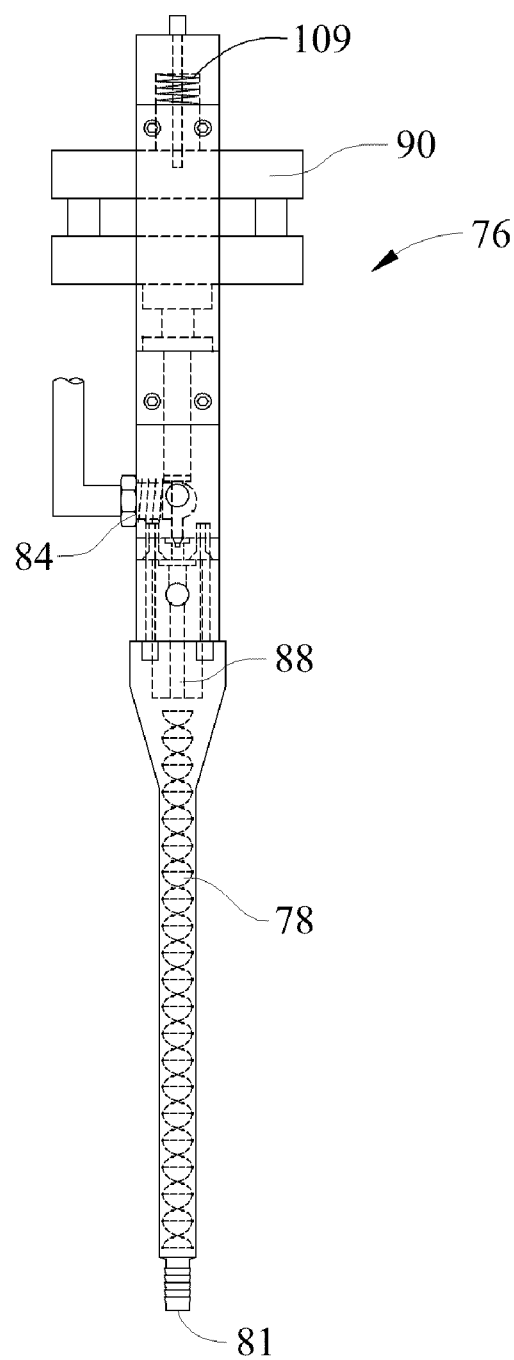
FIG. 29 is a right side plan view of a preferred embodiment of a mixing head for an apparatus for optimally mixing and injecting a two part urethane foam. The right side plan view is substantially symmetric with the left side plan view.
Figure 30:
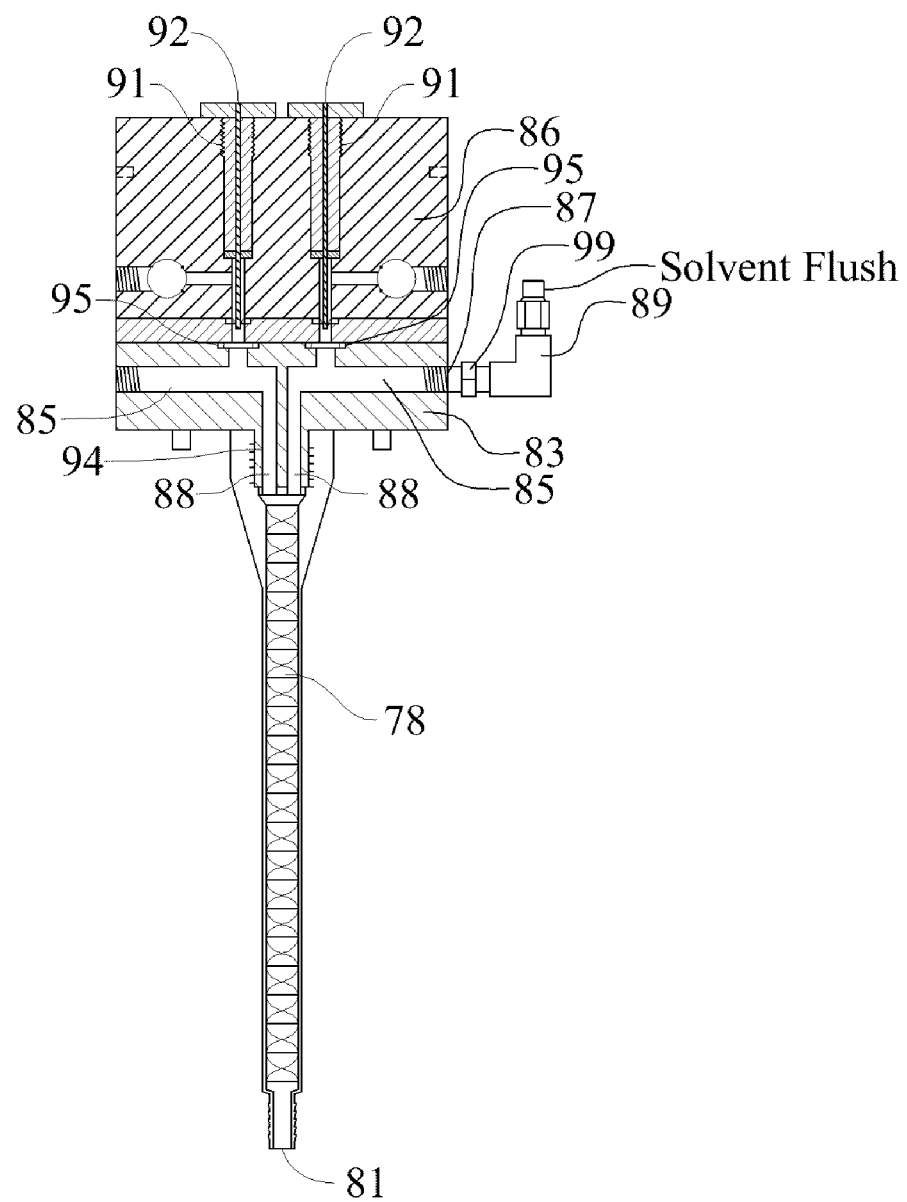
FIG. 30 is a front side mid-sectional view of a preferred embodiment of a mixing head for an apparatus for optimally mixing and injecting a two part urethane foam which further shows internal passages and components in phantom.
Figure 31:
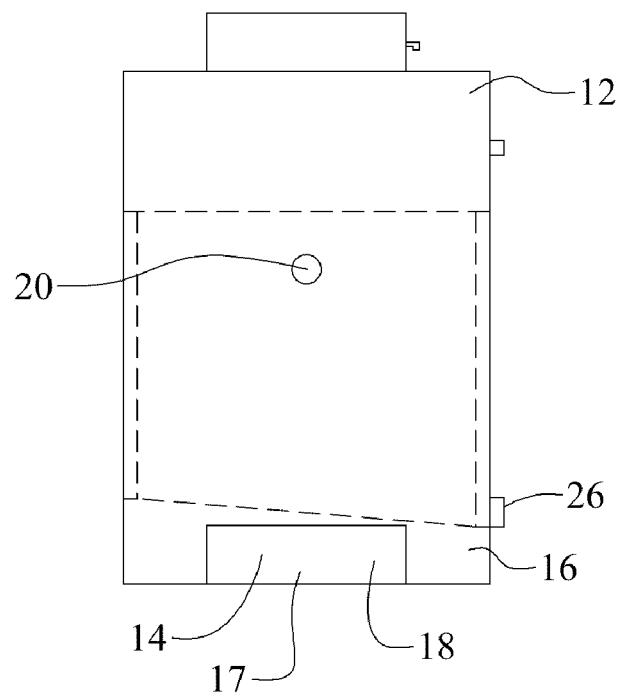
FIG. 31 is a right side plan view of an alternative embodiment of a heated holding tank and cavity shown in phantom and further showing the exiting port and heating element placement.
Figure 32:
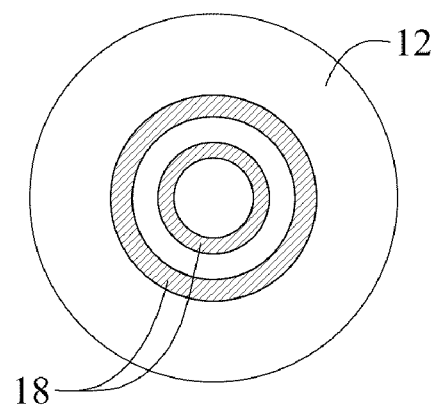
FIG. 32 is a bottom side plan view of an alternative embodiment of a heated holding tank further showing the heating element placement.
Figure 33:
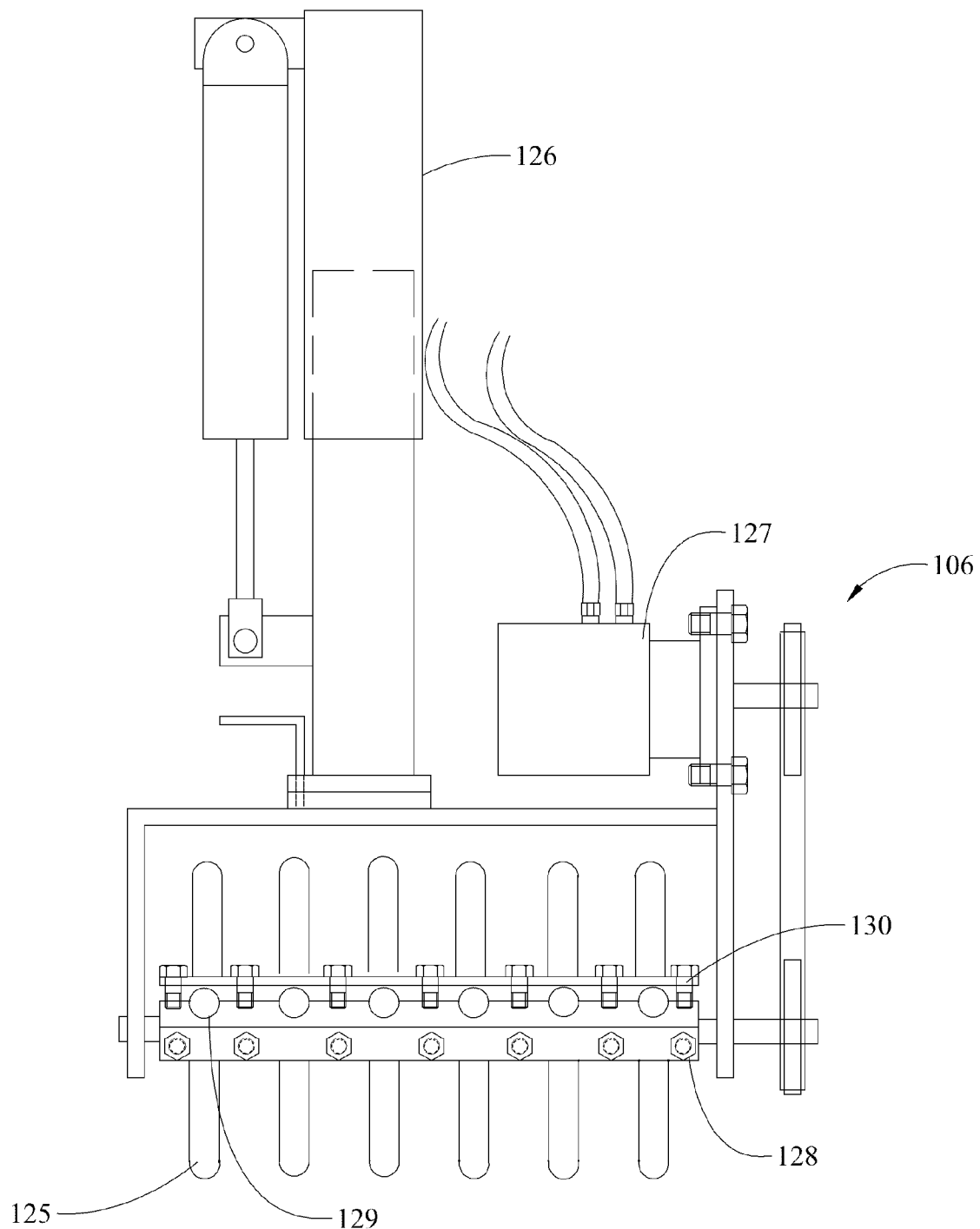
FIG. 33 is a front plan view of a cable brush assembly which is mounted upon the carriage of preferred or alternative embodiments.
Figure 12:
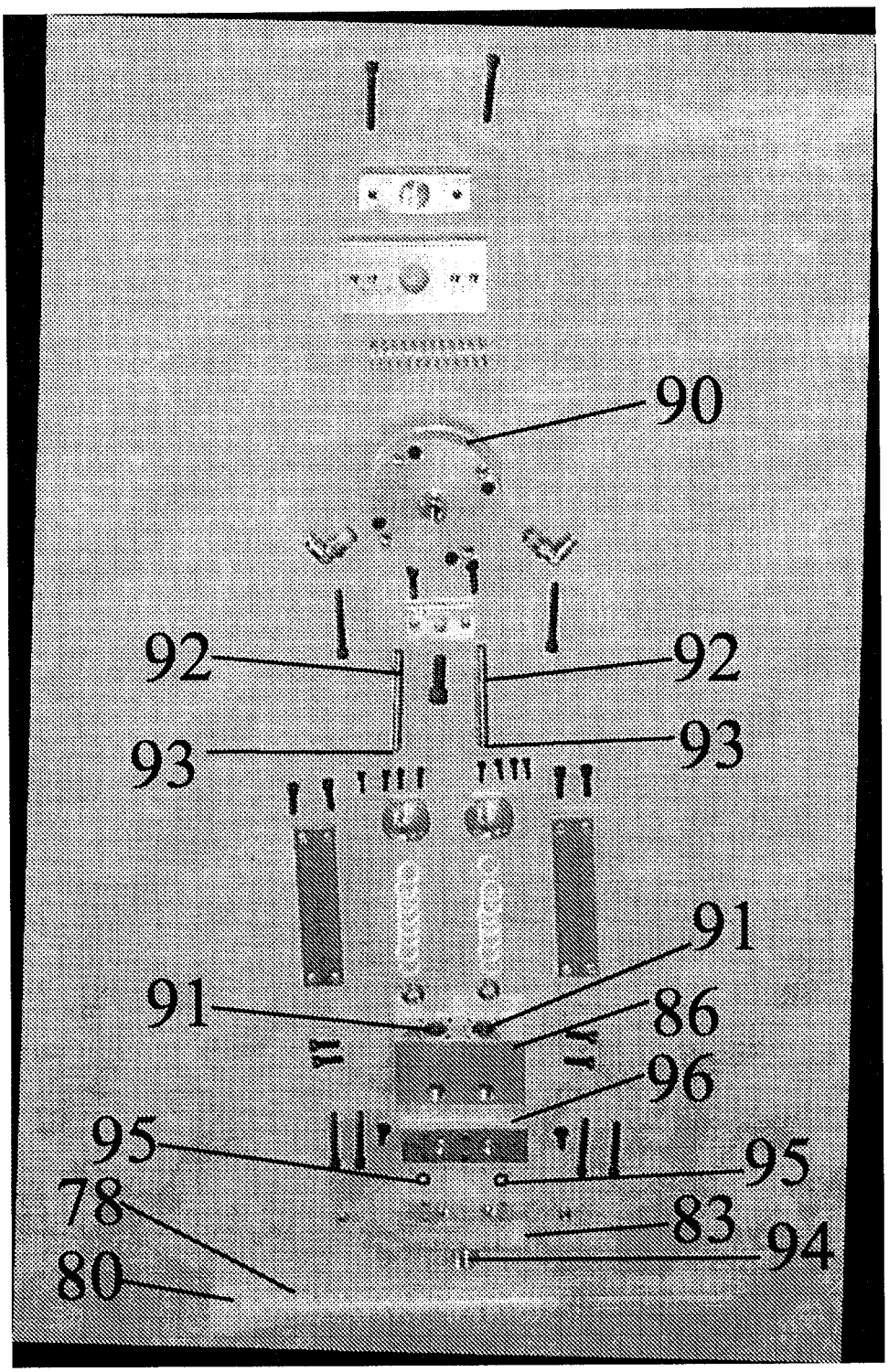
Figure 15:
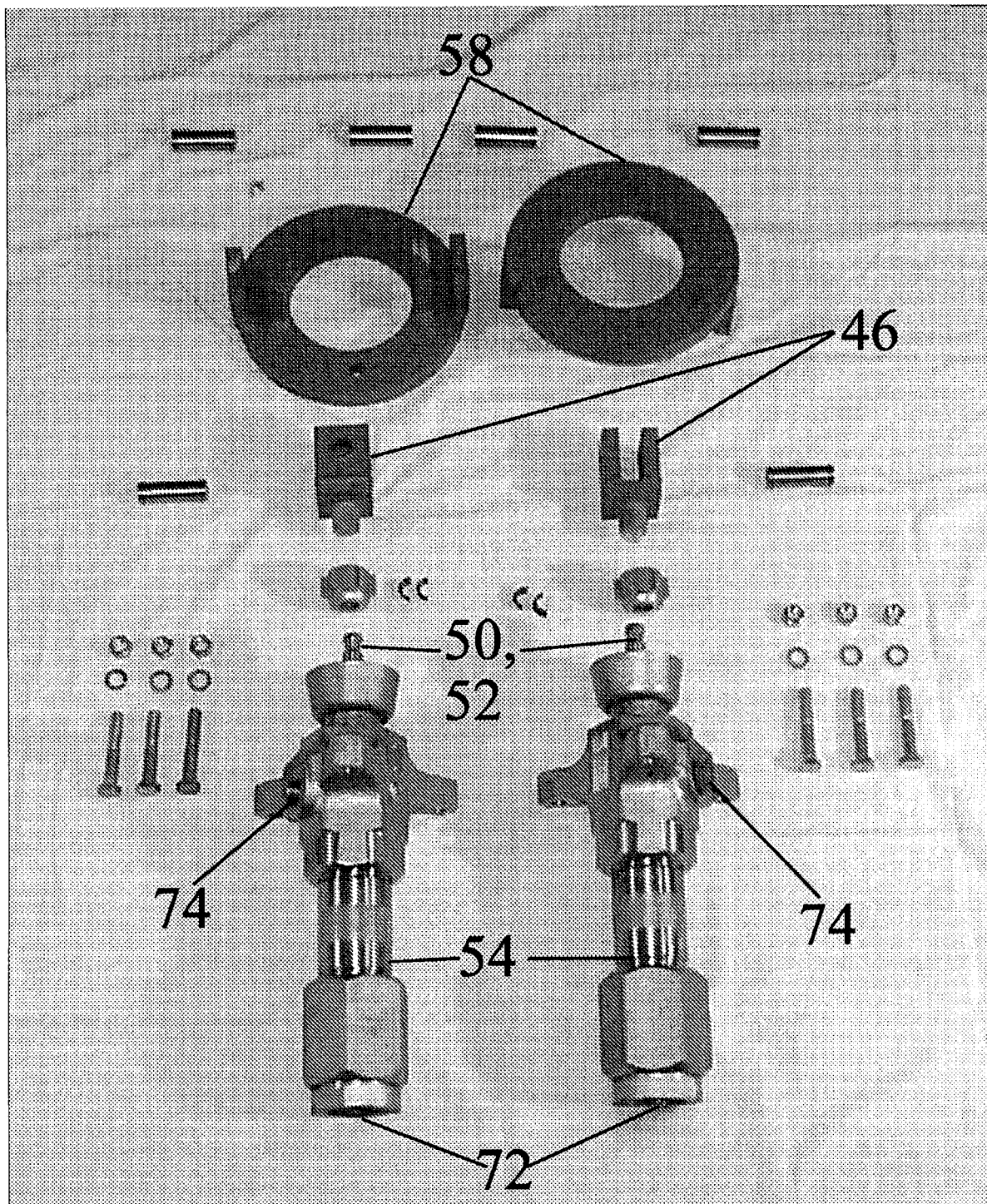

It is certified that error appears in the above-identified patent and that said Letters Patent is hereby corrected as shown below:

Figures 12 and 15 show the enumerators for the Figures 12 and 15 but do not show the black and white photographs associated with the enumerators. The included drawings, Figures 12 and 15, are the exact drawings as filed and as found through PAIR and which were filed on 01-01-2010.

Signed and Sealed this
Twenty-eighth Day of February, 2012

David J. Kappos
*Director of the United States Patent and Trademark Office*